United States Patent
Yu et al.

(10) Patent No.: US 12,069,641 B2
(45) Date of Patent: Aug. 20, 2024

(54) WIRELESS POSITIONING SIGNAL RECEPTION CONFIGURATION METHOD AND APPARATUS

(71) Applicant: Huawei Technologies Co., Ltd., Shenzhen (CN)

(72) Inventors: Yingjie Yu, Shanghai (CN); Su Huang, Shanghai (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 333 days.

(21) Appl. No.: 17/401,955

(22) Filed: Aug. 13, 2021

(65) Prior Publication Data

US 2021/0377975 A1  Dec. 2, 2021

Related U.S. Application Data

(63) Continuation of application No. PCT/CN2020/071864, filed on Jan. 13, 2020.

(30) Foreign Application Priority Data

Feb. 15, 2019 (CN) .......................... 201910118179.3
May 9, 2019 (CN) .......................... 201910385452.9

(51) Int. Cl.
*H04W 72/1263* (2023.01)
*H04W 24/10* (2009.01)
(Continued)

(52) U.S. Cl.
CPC ....... *H04W 72/1263* (2013.01); *H04W 24/10* (2013.01); *H04W 56/001* (2013.01); *H04W 72/0446* (2013.01); *H04W 72/0453* (2013.01)

(58) Field of Classification Search
CPC ......... H04W 72/1263; H04W 72/0446; H04W 72/0453; H04W 72/044; H04W 72/23;
(Continued)

(56) References Cited

U.S. PATENT DOCUMENTS 9,907,066 B2  2/2018  Park et al.
10,779,256 B2  9/2020  Edge et al.
(Continued)

FOREIGN PATENT DOCUMENTS

CN  101931862 A  12/2010
CN  105589506 A  5/2016
(Continued)

OTHER PUBLICATIONS

"3rd Generation Partnership Project; Technical Specification Group Radio Access Network; NR; Physical Layer Procedures for Control (Release 15)," 3GPP TS 38.213 V15.4.0, Dec. 2018, 104 pages.
(Continued)

*Primary Examiner* — Ricardo H Castaneyra
(74) *Attorney, Agent, or Firm* — SLATER MATSIL, LLP

(57) ABSTRACT

An information configuration method and apparatus, the method including receiving first configuration information, where the first configuration information includes configuration information of a time-frequency resource to which a positioning reference signal (PRS) is mapped and configuration information of a time-frequency resource to which a synchronization signal/physical broadcast channel (SS/PBCH) block is mapped, determining, based on the first configuration information, the time-frequency resource to which the PRS is mapped and the time-frequency resource to which the SS/PBCH block is mapped, and skipping receiving, when the time-frequency resource to which the SS/PBCH block is mapped overlaps the time-frequency
(Continued)

S501. Receive configuration information #E, where the configuration information #E includes configuration information of a time-frequency resource to which a positioning reference signal PRS is mapped and configuration information of a time-frequency resource to which a synchronization signal/physical broadcast channel SS/PBCH block is mapped S502. Determine, based on the configuration information #E, the time-frequency resource to which the PRS is mapped and the time-frequency resource to which the SS/PBCH block is mapped S503. Skip receiving, when the time-frequency resource to which the SS/PBCH block is mapped overlaps the time-frequency resource to which the PRS is mapped, the PRS on the overlapped time-frequency resource resource to which the PRS is mapped, the PRS on the overlapped time-frequency resource.

21 Claims, 7 Drawing Sheets

(51) Int. Cl.
*H04W 56/00* (2009.01)
*H04W 72/0446* (2023.01)
*H04W 72/0453* (2023.01)

(58) Field of Classification Search
CPC . H04W 56/001; H04W 64/006; H04W 24/10; H04L 5/0094; H04L 5/0048
See application file for complete search history.

(56) References Cited

U.S. PATENT DOCUMENTS

| | | | |
|---|---|---|---|
| 10,862,530 | B2 | 12/2020 | Chen et al. |
| 2012/0094691 | A1 | 4/2012 | Chen et al. |
| 2012/0184290 | A1 | 7/2012 | Kazmi et al. |
| 2013/0122930 | A1* | 5/2013 | Woo ............... H04L 5/0073 455/456.1 |
| 2016/0242062 | A1* | 8/2016 | Takeda ............... H04W 72/04 |
| 2018/0048444 | A1 | 2/2018 | Park et al. |
| 2018/0270699 | A1* | 9/2018 | Babaei ............ H04W 28/0278 |
| 2019/0200306 | A1* | 6/2019 | Ko .................... H04J 11/0069 |
| 2020/0119895 | A1* | 4/2020 | Choi .................. H04L 5/0053 |
| 2020/0145854 | A1 | 5/2020 | Harada et al. |
| 2020/0296728 | A1* | 9/2020 | Yoshimura ......... H04L 5/0092 |
| 2020/0305102 | A1 | 9/2020 | Jia et al. |

FOREIGN PATENT DOCUMENTS

| | | |
|---|---|---|
| CN | 105706385 A | 6/2016 |
| CN | 107465497 A | 12/2017 |
| CN | 109246829 A | 1/2019 |
| EP | 3497873 A1 | 6/2019 |
| JP | 2020522167 A | 7/2020 |
| KR | 20180018237 A | 2/2018 |
| WO | 2018217323 A1 | 11/2018 |
| WO | 2018235208 A1 | 12/2018 |

OTHER PUBLICATIONS

"3rd Generation Partnership Project; Technical Specification Group Radio Access Network; NR; Radio Resource Control (RRC) Protocol Specification (Release 15)," 3GPP TS 38.331 V15,4.0, Dec. 2018, 474 pages.

"OTDOA Enhancements," Agenda Item: 7.2.3.3, Source: Qualcomm Incorporated, Document for: Discussion and Decision, 3GPP TSG RAN WG1 Meeting #88, R1-1702544, Athens, Greece, Feb. 13-17, 2017, 4 pages.

"Align NR Attributes Definition Related to SSB with Corresponding NG-RAN IE Definition," Source to WG: Ericsson, Soource to TSG: S5, Work Item Code: Netslice-5GNRM, Date: Jan. 10, 2019, Category: F, Release: Rel-15, Change Request, 28.541, CR 0043, Rev 1, Current Version: 15.1.0, 3GPP TSG-SA5 Meeting #123, S5-191356, Montreal, Canada, Jan. 21-25, 2019, 10 pages.

"3rd Generation Partnership Project; Technical Specification Group Radio Access Network; Evolved Universal Terrestrial Radio Access (E-UTRA); Physical channels and modulation (Release 15)," 3GPP TS 36.211 V15.4.0, Dec. 2018, 240 pages.

3rd Generation Partnership Project; Technical Specification Group Radio Access Network; NR; Base Station (BS)radio transmission and reception (Release 15), 3GPP TS 38.104 V15.4.0, Dec. 2018, 208 pages.

"3rd Generation Partnership Project; Technical Specification Group Radio Access Network; NR; Physical channels and modulation (Release 15)," 3GPP TS 38.211 V15.4.0, Dec. 2018, 96 pages.

Chan, Y.T. et al., "A Simple and Efficient Estimator for Hyperbolic Location," IEEE Transactions on Signal Processing, vol. 42, No. 8, Aug. 1994, 11 pages.

"NR Positioning Reference Signals for OTDOA," Source: CATT, Agenda Item: 7.2.10.4, Document for: Discussion and Decision, 3GPP TSG RAN WG1 Meeting #95, R1-1812616, Spokane, USA, Nov. 12-16, 2018, 14 pages.

\* cited by examiner

WIRELESS POSITIONING SIGNAL RECEPTION CONFIGURATION METHOD AND APPARATUS

CROSS-REFERENCE TO RELATED APPLICATIONS

This application is a continuation of International Application No. PCT/CN2020/071864, filed on Jan. 13, 2020, which claims priority to Chinese Patent Application No. 201910118179.3, filed on Feb. 15, 2019 and Chinese Patent Application No. 201910385452.9, filed on May 9, 2019. All of the aforementioned patent applications are hereby incorporated by reference in their entireties.

TECHNICAL FIELD

This application relates to the communications field, and more specifically, to an information configuration method and apparatus.

BACKGROUND

With development of communication technologies, a high-precision positioning technology has been gradually defined as an important research project that is implemented by the 3rd Generation Partnership Project (3GPP) and that involves the 5th generation (5G) mobile communication system (5th generation mobile networks or 5th generation wireless systems, 5G).

An observed time difference of arrival (OTDOA) positioning technology is proposed in a long term evolution (LTE) system. In the OTDOA positioning technology, a plurality of base stations send positioning reference signals (PRS) to a terminal device, and the terminal device measures the PRSs sent by the plurality of base stations, to obtain signal arrival time information. The terminal device may report the signal arrival time information of the PRSs that is obtained through measurement to a location management unit, and the location management unit calculates a geographical location of the terminal device based on geographical locations of the plurality of base stations. Alternatively, the terminal device may calculate a geographical location of the terminal device based on the signal arrival time information of the PRSs that is obtained through measurement and with reference to geographical locations that are of the plurality of base stations and that are indicated by a location management unit.

A synchronization signal/physical broadcast channel (SS/PBCH) block is introduced into new radio (NR). When a PRS in NR is sent according to a configuration of a time-frequency resource mapped by a PRS in LTE, the PRS may collide with an SS/PBCH block, affecting positioning accuracy.

SUMMARY

This application provides an information configuration method and apparatus, to improve accuracy of receiving a positioning reference signal by a terminal device, thereby improving accuracy of positioning the terminal device.

According to a first aspect, an information configuration method is provided, and includes receiving first configuration information, where the first configuration information indicates configuration information of a time-frequency resource to which a positioning reference signal (PRS) is mapped and configuration information of a time-frequency resource to which a synchronization signal/physical broadcast channel SS/PBCH block is mapped, determining, based on the first configuration information, the time-frequency resource to which the PRS is mapped and the time-frequency resource to which the SS/PBCH block is mapped, and skipping receiving, when the time-frequency resource to which the SS/PBCH block is mapped overlaps the time-frequency resource to which the PRS is mapped, the PRS on the overlapped time-frequency resource.

It should be understood that, the skipping receiving, when the time-frequency resource to which the SS/PBCH block is mapped overlaps the time-frequency resource to which the PRS is mapped, the PRS on the overlapped time-frequency resource may be understood as: When the time-frequency resource to which the SS/PBCH block is mapped overlaps the time-frequency resource to which the PRS is mapped, the SS/PBCH block is received on the overlapped time-frequency resource, or when the time-frequency resource to which the SS/PBCH block is mapped overlaps the time-frequency resource to which the PRS is mapped, the PRS is not received on the overlapped time-frequency resource.

With reference to the first aspect, in some implementations of the first aspect, the configuration information of the time-frequency resource to which the SS/PBCH block is mapped includes a time domain distribution manner of the time-frequency resource to which the SS/PBCH block is mapped and frequency domain information of the time-frequency resource to which the SS/PBCH block is mapped, where the time domain distribution manner of the time-frequency resource to which the SS/PBCH block is mapped includes a case Case A, a case Case B, a case Case C, a case Case D, and a case Case E of the SS/PBCH block in an NR system.

With reference to the first aspect, in some implementations of the first aspect, the configuration information of the time-frequency resource to which the SS/PBCH block is mapped includes at least one of the following information: a subcarrier spacing of the time-frequency resource to which the SS/PBCH block is mapped, index information used to indicate the time-frequency resource to which the SS/PBCH block is mapped, or frequency information of the time-frequency resource to which the SS/PBCH block is mapped.

With reference to the first aspect, in some implementations of the first aspect, the index information used to indicate the time-frequency resource to which the SS/PBCH block is mapped includes a position of the SS/PBCH block in an SS/PBCH burst.

With reference to the first aspect, in some implementations of the first aspect, the determining, based on the first configuration information, the time-frequency resource to which the SS/PBCH block is mapped includes: determining, based on the time domain distribution manner of the time-frequency resource to which the SS/PBCH block is mapped, a location of a time domain resource to which the SS/PBCH block is mapped, and determining, based on the frequency domain information of the time-frequency resource to which the SS/PBCH block is mapped, a position of a frequency domain resource to which the SS/PBCH block is mapped.

With reference to the first aspect, in some implementations of the first aspect, the determining, based on the first configuration information, the time-frequency resource to which the SS/PBCH block is mapped includes: determining, based on the subcarrier spacing of the time-frequency resource to which the SS/PBCH block is mapped and the frequency information of the time-frequency resource to which the SS/PBCH block is mapped, a position of a time domain resource to which the SS/PBCH block is mapped.

With reference to the first aspect, in some implementations of the first aspect, the method further includes: measuring the positioning reference signal (PRS) to obtain a first measurement result, where the first measurement result includes arrival time of the PRS, and sending the first measurement result to a location management unit, where the first measurement result is used by the location management unit to determine location information of the terminal device.

With reference to the first aspect, in some implementations of the first aspect, the configuration information of the time-frequency resource to which the positioning reference signal (PRS) is mapped includes one or more of the following: a start resource block RB index, a port number, a frequency domain density, a start symbol index, a symbol quantity, a bandwidth, a configuration index, and frequency hopping indication information.

Because the terminal device does not receive the positioning reference signal (PRS) on the time-frequency resource on which the time-frequency resource to which the SS/PBCH block is mapped overlaps the time-frequency resource to which the PRS is mapped, interference between the positioning reference signal (PRS) and the synchronization signal/physical broadcast channel SS/PBCH block is reduced. Therefore, accuracy of positioning the terminal device is improved.

According to a second aspect, an information configuration method is provided, and includes: determining a time-frequency resource of a positioning reference signal (PRS) and a time-frequency resource of an SS/PBCH block, and skipping mapping, when the time-frequency resource of the SS/PBCH block overlaps the time-frequency resource of the PRS, the PRS to the overlapped time-frequency resource.

With reference to the second aspect, in some implementations of the second aspect, the method further includes: receiving a positioning request message sent by a location management unit, and sending first configuration information to the location management unit, where the first configuration information includes configuration information of the time-frequency resource to which the PRS is mapped and configuration information of the time-frequency resource to which the SS/PBCH block is mapped.

With reference to the second aspect, in some implementations of the second aspect, the configuration information of the time-frequency resource to which the SS/PBCH block is mapped includes a time domain distribution manner of the time-frequency resource to which the SS/PBCH block is mapped and frequency domain information of the time-frequency resource to which the SS/PBCH block is mapped, where the time domain distribution manner of the time-frequency resource to which the SS/PBCH block is mapped includes a case Case A, a case Case B, a case Case C, a case Case D, and a case Case E of the SS/PBCH block in an NR system.

With reference to the second aspect, in some implementations of the second aspect, the configuration information of the time-frequency resource to which the SS/PBCH block is mapped includes at least one of the following information: a subcarrier spacing of the time-frequency resource to which the SS/PBCH block is mapped, index information used to indicate the time-frequency resource to which the SS/PBCH block is mapped, or frequency information of the time-frequency resource to which the SS/PBCH block is mapped.

With reference to the second aspect, in some implementations of the second aspect, the index information used to indicate the time-frequency resource to which the SS/PBCH block is mapped includes a position of the SS/PBCH block in an SS/PBCH burst.

With reference to the second aspect, in some implementations of the second aspect, the configuration information of the time-frequency resource to which the positioning reference signal (PRS) is mapped includes one or more of the following: a start resource block RB index, a port number, a frequency domain density, a start symbol index, a symbol quantity, a bandwidth, a configuration index, and frequency hopping indication information.

Because the terminal device does not receive the positioning reference signal (PRS) on the time-frequency resource on which the time-frequency resource to which the SS/PBCH block is mapped overlaps the time-frequency resource to which the PRS is mapped, interference between the positioning reference signal (PRS) and the synchronization signal/physical broadcast channel SS/PBCH block is reduced. Therefore, accuracy of positioning the terminal device is improved.

According to a third aspect, an information configuration method is provided, and includes: receiving a positioning response message sent by a base station, where the positioning response message includes first configuration information, and sending the first configuration information to a terminal device, where the first configuration information includes configuration information of a time-frequency resource to which a positioning reference signal (PRS) is mapped and configuration information of a time-frequency resource to which a synchronization signal/physical broadcast channel SS/PBCH block is mapped.

With reference to the third aspect, in some implementations of the third aspect, the configuration information of the time-frequency resource to which the SS/PBCH block is mapped includes a time domain distribution manner of the time-frequency resource to which the SS/PBCH block is mapped and frequency domain information of the time-frequency resource to which the SS/PBCH block is mapped, where the time domain distribution manner of the time-frequency resource to which the SS/PBCH block is mapped includes a case Case A, a case Case B, a case Case C, a case Case D, and a case Case E of the SS/PBCH block in an NR system.

With reference to the third aspect, in some implementations of the third aspect, the configuration information of the time-frequency resource to which the SS/PBCH block is mapped includes at least one of the following information: a subcarrier spacing of the time-frequency resource to which the SS/PBCH block is mapped, index information used to indicate the time-frequency resource to which the SS/PBCH block is mapped, or frequency information of the time-frequency resource to which the SS/PBCH block is mapped.

It should be understood that index numbers of PBCHs represent sequence numbers that are of the PBCHs and that appear progressively by slots in a half frame in a case of a fixed configuration (a subcarrier spacing plus a frequency).

With reference to the third aspect, in some implementations of the third aspect, the method further includes: sending a positioning request message to the base station, where the positioning request message is used to request location information of the terminal device.

With reference to the third aspect, in some implementations of the third aspect, the method further includes: receiving a first measurement result sent by the terminal device, where the first measurement result is used by a location management unit to determine the location information of the terminal device.

Because the terminal device does not receive the positioning reference signal (PRS) on the time-frequency resource on which the time-frequency resource to which the SS/PBCH block is mapped overlaps the time-frequency resource to which the PRS is mapped, interference between the positioning reference signal (PRS) and the synchronization signal/physical broadcast channel SS/PBCH block is reduced. Therefore, accuracy of positioning the terminal device is improved.

According to a fourth aspect, a wireless communication apparatus is provided. The apparatus includes: a receiving unit, configured to receive first configuration information, where the first configuration information indicates configuration information of a time-frequency resource to which a positioning reference signal (PRS) is mapped and configuration information of a time-frequency resource to which a synchronization signal/physical broadcast channel SS/PBCH block is mapped, and a processing unit, configured to determine, based on the first configuration information, the time-frequency resource to which the PRS is mapped and the time-frequency resource to which the SS/PBCH block is mapped, where when the time-frequency resource to which the SS/PBCH block is mapped overlaps the time-frequency resource to which the PRS is mapped, the processing unit is further configured to control the receiving unit not to receive the PRS on the overlapped time-frequency resource.

It should be understood that, that when the time-frequency resource to which the SS/PBCH block is mapped overlaps the time-frequency resource to which the PRS is mapped, the PRS on the overlapped time-frequency resource is not received may be understood as: When the time-frequency resource to which the SS/PBCH block is mapped overlaps the time-frequency resource to which the PRS is mapped, the SS/PBCH block is received on the overlapped time-frequency resource, or when the time-frequency resource to which the SS/PBCH block is mapped overlaps the time-frequency resource to which the PRS is mapped, the PRS is not received on the overlapped time-frequency resource.

With reference to the fourth aspect, in some implementations of the fourth aspect, the processing unit is further configured to: measure the positioning reference signal (PRS) to obtain a first measurement result, where the first measurement result includes arrival time of the PRS, or measure the positioning reference signal (PRS) based on the first configuration information, to obtain a first measurement result.

With reference to the fourth aspect, in some implementations of the fourth aspect, the apparatus further includes a sending unit, and the sending unit is configured to send the first measurement result to a location management unit, where the first measurement result is used by the location management unit to determine location information of the terminal device.

According to a fifth aspect, a wireless communication apparatus is provided. The apparatus includes: a processing unit, configured to determine a time-frequency resource to which a positioning reference signal (PRS) is mapped and a time-frequency resource to which an SS/PBCH block is mapped, and a sending unit, configured to send the positioning reference signal (PRS) and/or the SS/PBCH block, where when the time-frequency resource to which the SS/PBCH block is mapped overlaps the time-frequency resource to which the positioning reference signal (PRS) is mapped, the processing unit is further configured to control the sending unit not to map the PRS to the overlapped time-frequency resource.

With reference to the fifth aspect, in some implementations of the fifth aspect, the apparatus further includes a receiving unit, where the receiving unit is configured to receive a positioning request message sent by a location management unit, and the receiving unit is further configured to send the first configuration information to the location management unit, where the first configuration information includes configuration information of the time-frequency resource to which the positioning reference signal (PRS) is mapped and configuration information of the time-frequency resource to which the synchronization signal/physical broadcast channel SS/PBCH block is mapped.

It should be understood that when the time-frequency resource to which the SS/PBCH block is mapped overlaps the time-frequency resource to which the positioning reference signal (PRS) is mapped, not sending the PRS on the overlapped time-frequency resource may be understood as: When the time-frequency resource to which the SS/PBCH block is mapped overlaps the time-frequency resource to which the PRS is mapped, the SS/PBCH block is sent on the overlapped time-frequency resource, or when the time-frequency resource to which the SS/PBCH block is mapped overlaps the time-frequency resource to which the PRS is mapped, the PRS is not sent on the overlapped time-frequency resource.

According to a sixth aspect, a wireless communication apparatus is provided. The apparatus includes: a receiving unit, configured to receive a positioning response message sent by a base station, where the positioning response message includes first configuration information, and a sending unit, configured to send the first configuration information to a terminal device, where the first configuration information includes configuration information of a time-frequency resource to which a positioning reference signal (PRS) is mapped and configuration information of a time-frequency resource to which a synchronization signal/physical broadcast channel SS/PBCH block is mapped.

The communication apparatus is used as a location management unit, for example, a location management function (LMF) network element or a radio access network-location management component (RAN-LMC).

With reference to the sixth aspect, in some implementations of the sixth aspect, the sending unit is further configured to send a positioning request message to the base station, where the positioning request message is used to request location information of the terminal device.

With reference to the sixth aspect, in some implementations of the sixth aspect, the receiving unit is further configured to receive a first measurement result sent by the terminal device, where the first measurement result is used by a location management unit to determine the location information of the terminal device.

According to a seventh aspect, this application provides a storage medium storing a computer program. When the computer program is executed by a processor, the method according to at least one of the first aspect to the third aspect is performed.

According to an eighth aspect, this application provides a chip system. The chip system includes a processor, configured to perform the method according to at least one of the first aspect to the third aspect.

According to a ninth aspect, this application provides a communication apparatus. The communication apparatus includes a processor. The processor is coupled to a memory, and the memory is configured to store a program. When the program is executed by the processor, the communication apparatus is enabled to implement the method according to at least one of the first aspect to the third aspect.

The communication apparatus may be, for example, a terminal, a network device (for example, a base station), or a chip, a chip system, or a processor that can support the terminal or the network device in implementing the foregoing functions.

According to a tenth aspect, this application provides a communication system, including the foregoing network device, terminal device, and location management unit.

Because the terminal device does not receive the positioning reference signal (PRS) on the time-frequency resource on which the time-frequency resource to which the SS/PBCH block is mapped overlaps the time-frequency resource to which the PRS is mapped, interference between the positioning reference signal (PRS) and the synchronization signal/physical broadcast channel SS/PBCH block is reduced. Therefore, accuracy of positioning the terminal device is improved.

DETAILED DESCRIPTION OF ILLUSTRATIVE EMBODIMENTS

Figure 1:
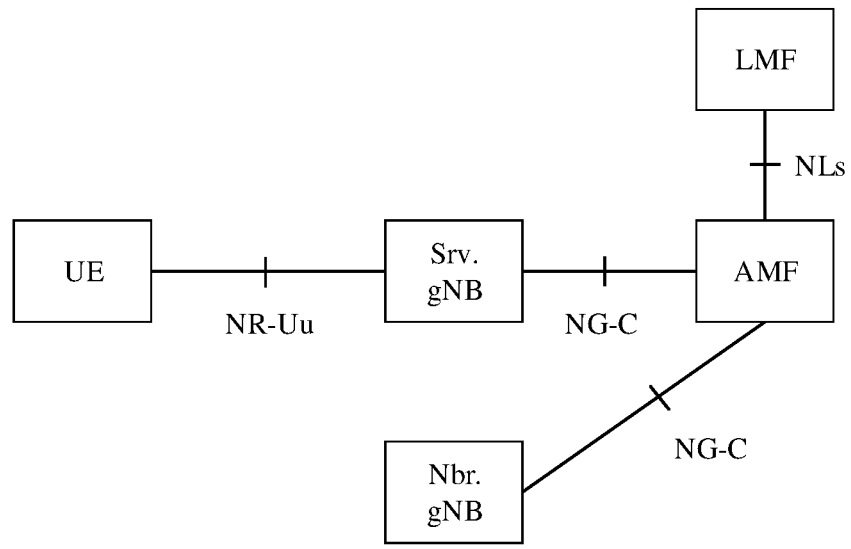
FIG. 1 is an architectural diagram of a communication system according to this application.

The following describes technical solutions in this application with reference to the accompanying drawings.

The technical solutions in the embodiments of this application may be applied to various communication systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, and a 5th generation (5G) system or new radio (NR) system.

It should be understood that, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by a terminal device or a network device, or a function module, such as a chip, that is in the terminal device or the network device and that can invoke and execute the program.

The terminal device in the embodiments of this application may also be referred to as a terminal, and may be a device having a wireless transceiver function. The terminal device may be deployed on land, and includes an indoor device, an outdoor device, a handheld device, a wearable device, a vehicle, or a vehicle-mounted device. Alternatively, the terminal device may be deployed on a water surface (for example, on a ship), or may be deployed in the air (for example, on an aircraft, a balloon, or a satellite). The terminal device may be user equipment (UE). The UE includes a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like.

In the embodiments of this application, an apparatus that implements a function of the terminal may be a terminal, or may be an apparatus that supports the terminal to implement the function, such as a chip, a circuit, or another apparatus. In the embodiments of this application, an example in which an apparatus that implements a function of the terminal is the terminal is used to describe the technical solutions provided in the embodiments of this application. In the embodiments of this application, the network device may be a device configured to communicate with the terminal device. The network device may be a base transceiver station (BTS) in a global system for mobile communications (GSM) system or a code division multiple access (CDMA) system, may be a NodeB (NB) in a wideband code division multiple access (WCDMA) system, may be an evolved NodeB (eNB or eNodeB) in an LTE system, or may be a radio controller in a scenario of a cloud radio access network (CRAN). Alternatively, the network device may be a relay node, an access point, a vehicle-mounted device, a wearable device, a network device in a future 5G network, a network device in a future evolved PLMN network, or the like, may be an access point (AP) in a WLAN, or may be a gNB in a new radio (NR) system. This is not limited in the embodiments of this application.

In addition, in the embodiments of this application, an access network device serves a cell. The terminal device communicates with the access network device on a transmission resource (for example, a frequency domain resource, namely, a spectrum resource) used for the cell. The cell may be a cell corresponding to the access network device (for example, a base station). The cell may belong to a macro base station, or a base station corresponding to a small cell. The small cell herein may include a metro cell, a micro cell, a pico cell (pico cell), a femto cell (femto cell), or the like. These small cells have features of small coverage and low transmit power, and are suitable for providing a high-rate data transmission service.

In the LTE system, a primary synchronization signal (PSS), a secondary synchronization signal (SSS), and a physical broadcast channel (PBCH) have fixed time-frequency positions. In frequency domain, the PSS, the SSS, and the PBCH are all located in six physical resource blocks (PRB) in a center of a carrier. In time domain: In frequency division duplex (FDD) spectrums, the PSS is located in the last symbols of LTE slots 0 and 10, and in time division duplex (TDD) spectrums, the PSS is located in the third symbols of a subframe 1 and a subframe 6, in FDD spectrums, the SSS is located in the last but one symbols of LTE slots 0 and 10, and in TDD spectrums, the SSS is located in the last symbols of slots 1 and 11, and the PBCH is located in the first four symbols in an LTE slot 1.

The NR system supports a more flexible reference signal (RS) configuration, which provides space for optimization of a PRS. An SS/PBCH block in the NR system includes a PSS, an SSS, and a PBCH. A frequency of the SS/PBCH block is configurable. A maximum of 4, 8, or 64 SS/PBCH blocks can be transmitted in a cell, depending on a band. An actually sent SS/PBCH block may also be selected from the 4, 8, and 64 SS/PBCH blocks. Therefore, distribution of NR SS/PBCH blocks in time domain and frequency domain is flexible and configurable. A subcarrier spacing and a time domain position of the NR SS/PBCH block include the following five possibilities:

Case A: A subcarrier spacing is 15 kHz, and a maximum of four (less than 3 GHz) or eight (3 GHz to 6 GHz) SS/PBCH blocks are supported. For a maximum of four SS/PBCH blocks, the first symbol of each SS/PBCH block is separately mapped to symbols 2 and 8 of a slot 0 and a slot 1. For a maximum of eight SS/PBCH blocks, the first symbol of each SS/PBCH block is separately mapped to symbols 2 and 8 of a slot 0, a slot 1, a slot 2, and a slot 3.

Case B: A subcarrier spacing is 30 kHz, and a maximum of four (less than 3 GHz) or eight (3 GHz to 6 GHz) SS/PBCH blocks are supported. For a maximum of four SS/PBCH blocks, the first symbol of each SS/PBCH block is separately mapped to symbols 4 and 8 of a slot 0 and symbols 2 and 6 of a slot 1. For a maximum of eight SS/PBCH blocks, the first symbol of each SS/PBCH block is separately mapped to symbols 4 and 8 of a slot 0 and a slot 2, and symbols 2 and 6 of a slot 1 and a slot 3.

Case C: A subcarrier spacing is 30 kHz, and a maximum of four (less than 3 GHz in FDD or less than 2.4 GHz in TDD) SS/PBCH blocks or eight (3 GHz to 6 GHz in FDD or 2.4 GHz to 6 GHz in TDD) SS/PBCH blocks are supported. For a maximum of four SS/PBCH blocks, the first symbol of each SS/PBCH block is separately mapped to symbols 2 and 8 of a slot 0 and a slot 1. For a maximum of eight SS/PBCH blocks, the first symbol of each SS/PBCH block is separately mapped to symbols 2 and 8 of a slot 0, a slot 1, a slot 2, and a slot 3.

Case D: A subcarrier spacing is 120 kHz, and a maximum of 64 SS/PBCH blocks are supported. The first symbol of each SS/PBCH block is separately mapped to symbols 4 and 8 of a slot 0, a slot 2, a slot 4, a slot 6, a slot 10, a slot 12, a slot 14, a slot 16, a slot 20, a slot 22, a slot 24, a slot 26, a slot 30, a slot 32, a slot 34, and a slot 36, and symbols 2 and 6 of a slot 1, a slot 3, a slot 5, a slot 7, a slot 11, a slot 13, a slot 15, a slot 17, a slot 21, a slot 23, a slot 25, a slot 27, a slot 31, a slot 33, a slot 35, and a slot 37.

Case E: A subcarrier spacing is 240 kHz, and a maximum of 64 SS/PBCH blocks are supported. The first symbol of each SS/PBCH block is separately mapped to symbols 8 and 12 of a slot 0, a slot 4, a slot 8, a slot 12, a slot 20, a slot 24, a slot 28, and a slot 32, symbols 2 and 6 of a slot 1, a slot 5, a slot 9, a slot 13, a slot 21, a slot 25, a slot 29, and a slot 33, symbols 4, 8, and 12 of a slot 2, a slot 6, a slot 10, a slot 14, a slot 22, a slot 26, a slot 30, and a slot 34, and symbols 2 of a slot 3, a slot 7, a slot 11, a slot 15, a slot 23, a slot 27, a slot 31, and a slot 35.

For ease of understanding of the embodiments of this application, some concepts or terms used in this application are first briefly described.

1. Downlink Reference Information

A plurality of types of downlink reference information are defined in NR, and each type of reference signal has a different application scenario. Each antenna port corresponds to one time-frequency resource grid, and corresponds to one reference signal (RS). On a downlink, a set of antenna ports supported by a cell depends on a reference signal configuration of the cell. A downlink reference signal occupies a specific RE on a time-frequency resource grid.

2. Positioning Reference Signal

In the TD-LTE R9 specification, for an OTDOA positioning requirement, a new reference signal (positioning reference signal, PRS) is specially introduced, and occupies a plurality of central PRBs in a so-called positioning subframe (positioning subframe). The PRS can be transmitted on a fixed antenna port (port 6) with relatively high power, to achieve large-scale coverage. A terminal measures, based on a PRS of each cell, a moment at which the signal of the cell arrives at the terminal.

The positioning reference signal (PRS) is transmitted on a resource block that is in a downlink subframe and that is configured for transmitting the positioning reference signal. If both a normal subframe and an MBSFN subframe are configured as positioning subframes in a cell, an OFDM symbol that is in an MBSFN subframe and that is configured for transmitting the positioning reference signal needs to use a same cyclic prefix length as a subframe #0. If only MBSFN subframes are configured as positioning subframes in a cell, OFDM symbols that are configured for transmitting the positioning reference signal and that are in MBSFN areas of these subframes need to use an extended cyclic prefix length. In a subframe configured for transmitting the positioning reference signal, a start position of an OFDM symbol configured for transmitting the positioning reference signal needs to be the same as start positions of all OFDM symbols that are in the subframe and that have a same cyclic prefix length as the OFDM symbol configured for transmitting the positioning reference signal. The positioning reference signal is transmitted on an antenna port 6. The positioning reference signal should not be mapped to resource elements (k, l) allocated to a PBCH, a PSS, or an SSS, regardless of their antenna ports p.

It should be understood that the positioning reference signal may also be referred to as a reference signal used for positioning. This is not limited in this application.

3. Observed Time Difference of Arrival

In an observed time difference of arrival (OTDOA) positioning technology, a plurality of base stations send positioning reference signals (Positioning Reference Signals, PRS) to a terminal device, and the terminal device measures the PRSs sent by the plurality of base stations, to obtain signal arrival time information. The terminal device may report the signal arrival time information of the PRSs that is obtained through measurement to a location management unit, and the location management unit calculates a geographical location of the terminal device based on geographical locations of the plurality of base stations. Alternatively, the terminal device may calculate a geographical location of the terminal device based on the signal arrival time information of the PRSs that is obtained through measurement and with reference to geographical locations that are of the plurality of base stations and that are indicated by a location management unit.

OTDOA is a technology of positioning performed based on a time difference of signal propagation between the mobile terminal and each of a plurality of base stations, for example, three base stations. According to OTDOA, a distance difference between the mobile terminal and two base stations is calculated by measuring time differences of wireless signal transmission from the terminal device to the two base stations. A moving track of the mobile terminal is a hyperbola in which the two base stations are used as foci and the distance difference between the mobile terminal and the two base stations is used as a constant difference. To achieve precise positioning, same measurement and calculation need to be performed on the other two base stations, to obtain another hyperbola. Because the network device knows a propagation delay from a serving base station to the mobile terminal, a distance from the base station to the mobile terminal may be estimated based on an OTDOA measurement value provided by the mobile terminal. An intersection point of different circles formed by three base stations is an estimated terminal location.

FIG. 1 is an architectural diagram of a communication system according to an embodiment of this application.

Referring to FIG. 1, the communication system includes a terminal device, a serving base station (which may also be referred to as a serving cell) of the terminal device, a neighboring base station (which may also be referred to as a neighboring cell) of the terminal device, a location management function network element (LMF), and an access management network element (AMF). The serving base station of the terminal device provides an access service for the terminal device. After accessing the base station, the terminal device may communicate with the location management function network element by using the base station. The LMF is configured to perform positioning calculation on the terminal device based on a measurement result of the base station. The AMF is a control plane network element provided by an operator, and is responsible for access control and mobility management for a terminal to access an operator network. The terminal device communicates with the serving base station by using a cellular link (Uu link). The serving base station, the neighboring base station, and the AMF communicate with each other through an NG-C interface, and the AMF communicates with the LMF through an NLs interface.

A downlink positioning process in a 5G NR system mainly includes: generation of a positioning request, transmission of resource configuration information, signal transmission and measurement, and transmission of measurement information. The downlink positioning process mainly includes the following network elements: a mobile terminal UE, a location management unit LMF (LMF), a serving gNB Serving gNB, a neighboring gNB Neighbor gNB, and a mobility management unit (AMF). The AMF is equivalent to a router for communication between the gNB and the LMF.

Figure 2:
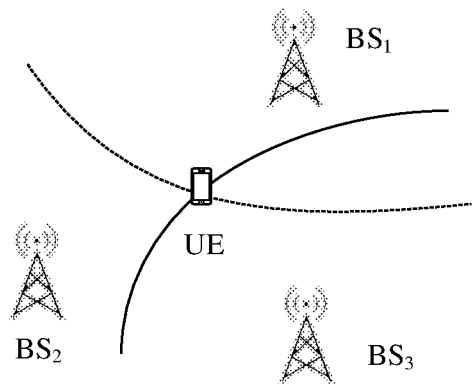
FIG. 2 is a schematic diagram of time frequency resource division based on an LTE system.

FIG. 2 is a schematic diagram of time frequency resource division based on an LTE system.

Referring to FIG. 2, one radio frame is a delay of 10 milliseconds (ms), one radio frame is divided into 10 subframes, each subframe occupies a delay of 1 ms, and each subframe may be further divided into two slots. Each slot may include a different quantity of OFDM symbols due to a different operating frequency. A time frequency resource in the LTE system may be divided into a plurality of resource blocks, each resource block may further be divided into a plurality of resource elements, and each resource element occupies one OFDM symbol in time domain and occupies one subcarrier in frequency domain. On a resource block, one OFDM symbol may correspond to a plurality of subcarriers.

It should be understood that a minimum granularity in frequency domain is one subcarrier, and one time-frequency resource element (resource element, RE) includes one OFDM symbol and one subcarrier. An RE is used as a basic unit during resource mapping at a physical layer. All OFDM symbols in one slot and 12 subcarriers in frequency domain form one resource block (RB), and the resource block may be used as a basic unit for resource scheduling.

In the embodiments, a solution in which a gNB configures a positioning reference signal during OTDOA positioning, and an information element to be added to signaling are described. The OTDOA positioning may be initiated by an LMF, the gNB, or a terminal. The following uses triggering by the LMF as an example.

Figure 3:
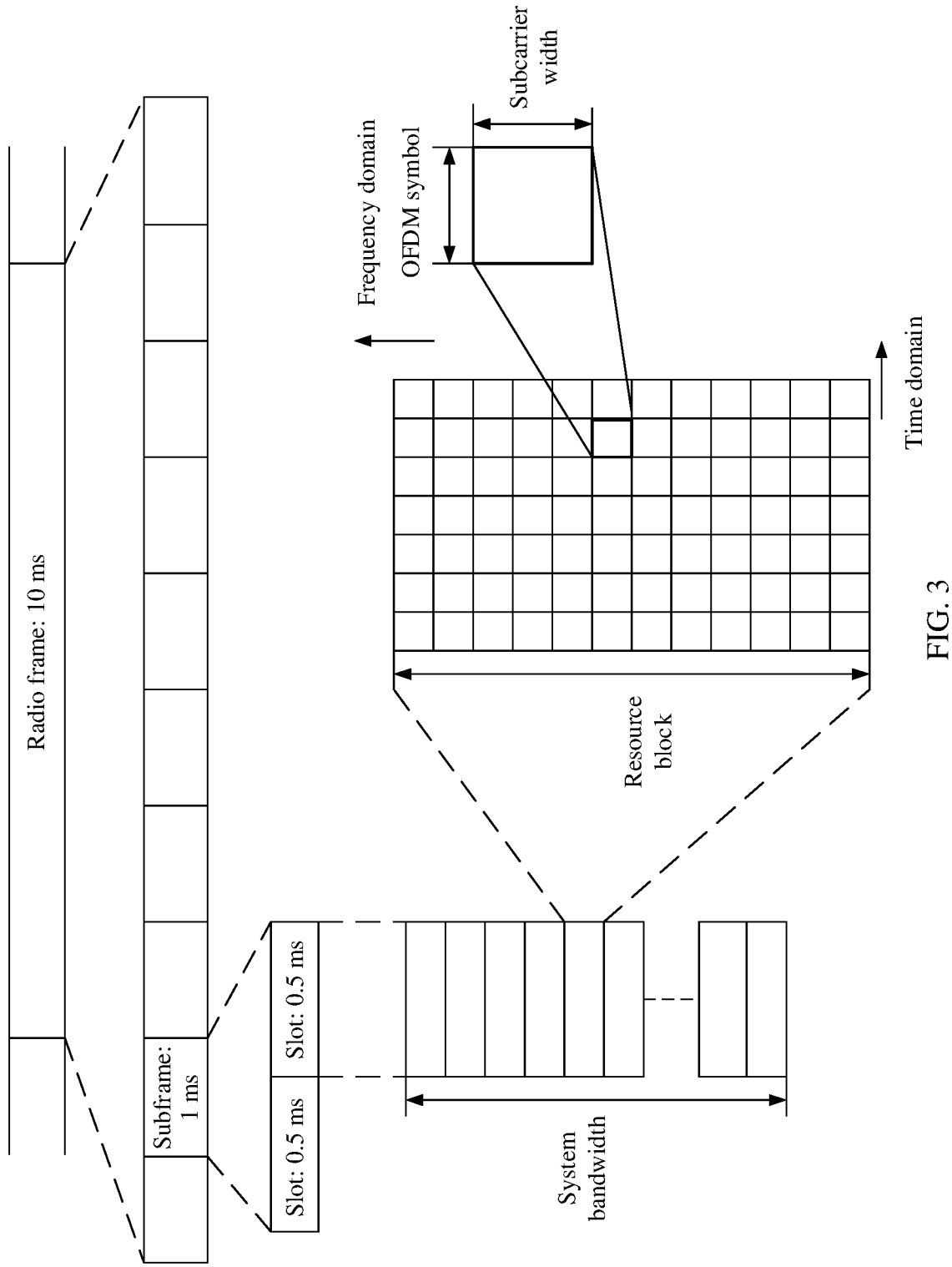
FIG. 3 is a schematic diagram of an OTDOA positioning principle according to this application.

FIG. 3 is a schematic diagram of an OTDOA positioning principle according to this application.

Referring to FIG. 3, a terminal device measures a positioning reference signal (PRS) sent by a base station, to calculate a time difference of arrival (TDOA) of the signal. The terminal device can be positioned by using at least two TDOA measurement values. This method is referred to as an observed time difference of arrival (OTDOA) positioning method.

A downlink positioning process in a 5G NR system mainly includes: generation of a positioning request, transmission of resource configuration information, signal transmission and measurement, and transmission of measurement information. The downlink positioning process mainly includes the following network elements: a mobile terminal UE, a location management unit LMF (LMF), a serving gNB Serving gNB, a neighboring gNB Neighbor gNB, and a mobility management unit (AMF). The AMF is equivalent to a router for communication between the gNB and the LMF, and transmission of a positioning information NR positioning protocol annex (NRPPa) between the LMF and the gNB is transparent transmission.

The serving gNB and/or the neighboring gNB configure/configures a reference signal used for positioning, which may be described from two aspects: frequency domain and time domain.

For example, in frequency domain, a bandwidth may be selected from 24/48/96/192/264. If 24 is selected, it indicates that the bandwidth is 24 physical resource blocks (PRB). A start common resource block (CRB) may be any one of RB 0 to RB 2169. A density and a port quantity are combined to configure frequency domain distribution in an RB. The density may be 1, 2, or 3, and the port quantity may be 1 or 2.

For example, according to a mapping rule of a channel state information reference signal CSI-RS in NR, a "12-bit bitmap or PRS ID mod 12 with a density of 1 and a port quantity of 1" is used as an example. When the density is 1, the port quantity is 1, and a 12-bit bitmap is used for indication, for example, the bitmap is 000000000001, it indicates that a PRS is mapped to a first RE (that is, an RE index is 0) in a sending RB. When the density is 1, the port quantity is 1, and PRS ID mod 12 is used for indication, for example, PRS ID=100, it indicates that the PRS is mapped to an RE (that is, the fifth RE) whose RE index is 100 mod 12=4 in the sending RB. When the port quantity is 2, the PRS is mapped to two adjacent REs in a PRB.

For example, in time domain, a start symbol and a symbol quantity are configured in a start and length indicator (SLIV) manner in a case of continuous arrangement, and are configured in a bitmap manner in a case of discontinuous arrangement.

For example, a relationship between an SLIV and a time-domain symbol may be as follows:

if $(L-1) \leq 7$ then $$SLIV=14 \cdot (L-1)+S$$

else where $0<L \leq 14-S$, S is a start symbol index, and L is a quantity of consecutive symbols. For example, to indicate that the PRS is mapped to symbols 2, 3, 4, and 5, which is equivalent to S=2 and L=4, SLIV=14*(4−1)+2=44 is calculated according to the formula. Similarly, S=2 and L=4 may also be deduced from SLIV=44. In the bitmap manner, a 14-bit bitmap is used to indicate a symbol to which the PRS is mapped. For example, 00110110000000 is used to indicate that the PRS is mapped to symbols 2, 3, 5, and 6.

The following describes in detail an information configuration method provided in this application.

Figure 4:
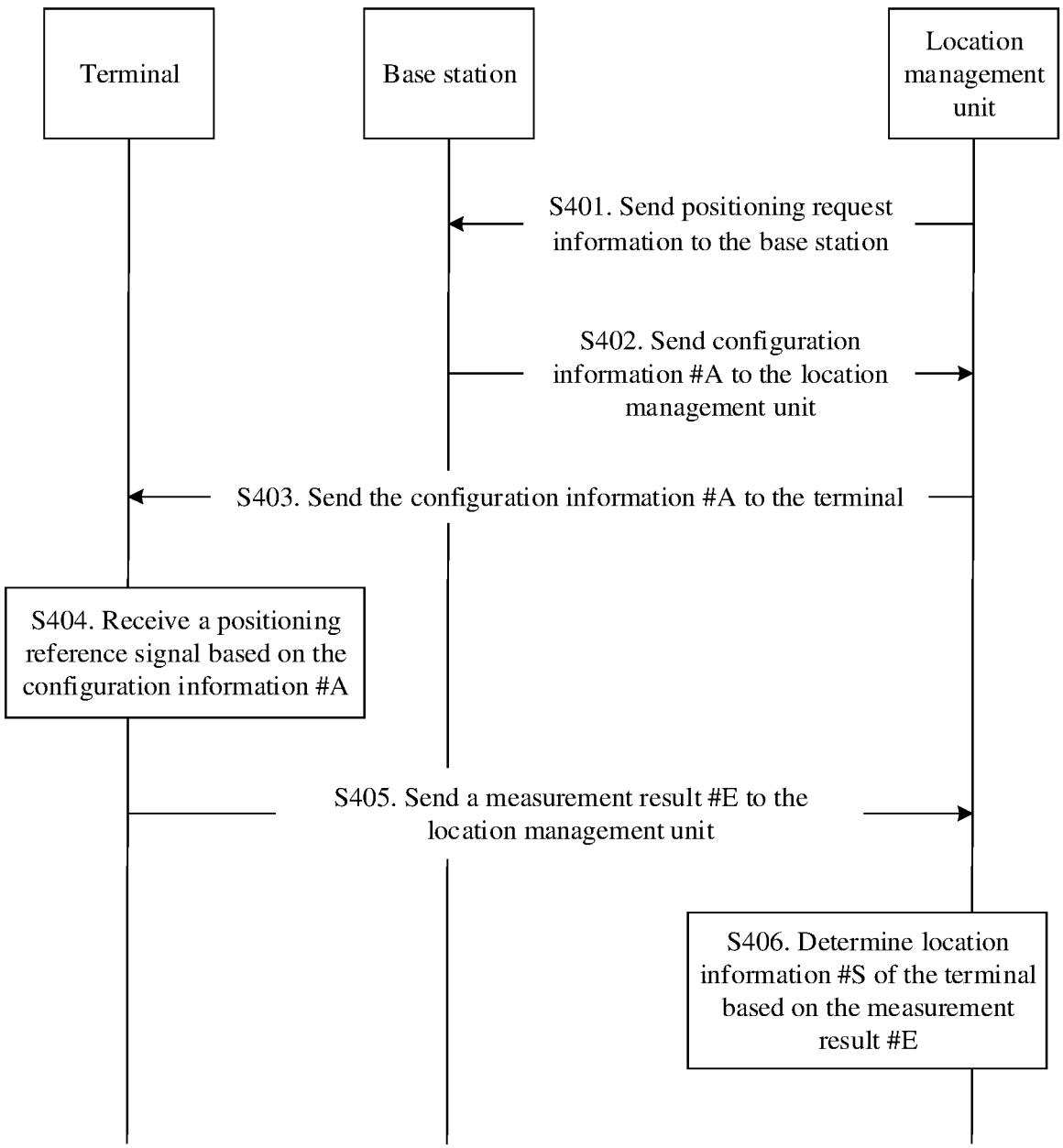
FIG. 4 is a schematic interaction diagram of a positioning method according to this application.

FIG. 4 is a schematic interaction diagram of a positioning method according to this application.

In S401, a location management unit sends a positioning request message to a base station.

For example, the location management unit requests, from the base station, information required for OTDOA positioning. As shown in Table 1, the information includes configuration information of a positioning reference signal, for example, a bandwidth, a cyclic prefix length, an antenna port quantity, and a sequence number.

Optionally, the positioning request message is further used to request the base station to report configuration information of a time-frequency resource to which an SS/PBCH block is mapped.

TABLE 1

Content of a positioning request message

| Information Name | Description |
|---|---|
| OTDOA Information Type | Requests information required for OTDOA positioning |
| >OTDOA Information Item | Includes configuration information of a positioning reference signal: a bandwidth, a cyclic prefix length, an antenna port quantity, a sequence number, and the like |

In S402, the base station sends configuration information #A to the location management unit, where the configuration information #A includes configuration information of a time-frequency resource of the positioning reference signal and the configuration information of the time-frequency resource of the SS/PBCH block.

For example, a gNB sends configuration information of a reference signal used for positioning to an LMF by using an NRPPa. The configuration information is shown in the following Table 2:

TABLE 2

Information elements included in configuration information #A

| Information Name | Description |
|---|---|
| SSB Information | Indicates a time-frequency resource configuration of an SS/PBCH block |
| >SS Block SCS | Subcarrier spacing of the SS/PBCH block |
| >SSB-PositionsInBurst | Index of an SS/PBCH block that is actually sent, which is indicated by using a bitmap (bitmap) |
| >ssbFrequency | Center frequency of the SS/PBCH block |
| >ssbsymbolindex (optional) | Symbol index of the SS/PBCH block |
| >ssbPeriodicity (optional) | Periodicity of the SS/PBCH block |
| >ssboffset (optional) | Offset of the SS/PBCH block, which is an offset relative to initialization time of a system frame, where a value of the offset may be an integer multiple of 0 ms or 5 ms |
| >SFN Initialization Time (Optional) | Initialization time of the system frame number (System Frame Number, SFN) |
| OTDOA Cells | Broadcasts positioning reference signals in a plurality of cells |
| >OTDOA Cell Information | Configuration information of a positioning reference signal in each cell |
| >>CHOICE OTDOA Cell Information Item | OTDOA cell information item |

TABLE 2-continued

Information elements included in configuration information #A

| Information Name | Description |
| --- | --- |
| >>>EARFCN | E-UTRA absolute radio frequency signal |
| >>>PRS Bandwidth | EUTRA Bandwidth |
| >>>PRS Configuration Index | EUTRA Configuring index information |
| >>>CP Length EUTRA | Cyclic prefix length |
| >>>Number of DL Antenna Ports EUTRA | Antenna port quantity |
| >-PRS-ID EUTRA | Sequence number |

In Table 2, SSB information indicates the configuration information of the time-frequency resource of the SS/PBCH block, and OTDOA Cells indicate the time-frequency resource configuration information of the positioning reference signal. OTDOA Cells may also be different from the parameters in the Table 2.

For example, the parameters include one or more of the following: a start RB index, a port number, a frequency domain density, a start OFDM symbol index, and a symbol quantity.

Optionally, a gNB sends configuration information of a reference signal used for positioning to an LMF by using an NRPPa. The configuration information is shown in the following Table 3:

In Table 3, SSB information indicates the time-frequency resource configuration information of the SS/PBCH block, and OTDOA Cells indicate the time-frequency resource configuration information of the positioning reference signal. OTDOA Cells may also be different from parameters in the following Table 3.

For example, the parameters include one or more of the following: a start RB index, a port number, a frequency domain density, a start OFDM symbol index, and a symbol quantity.

A time domain distribution manner of the SS/PBCH block may be a case Case A, a case Case B, or a case Case C in Table 3, or a case Case D or a case Case E in Table 4.

TABLE 3

Information elements included in configuration information #A

| Information Name | Description |
| --- | --- |
| SSB Information | Indicates a time-frequency resource configuration of an SS/PBCH block |
| Time domain distribution manner of the SS/PBCH block | a case Case A, a case Case B, a case Case C, a case Case D, or a case Case E |
| Frequency domain information mapped to the SS/PBCH block | Information about an RB to which the SS/PBCH block is mapped |
| >ssbsymbolindex (optional) | Symbol index of the SS/PBCH block |
| >ssbPeriodicity (optional) | Periodicity of the SS/PBCH block |
| >ssboffset (optional) | Offset of the SS/PBCH block, which is an offset relative to initialization time of a system frame, where a value of the offset may be an integer multiple of 0 ms or 5 ms |
| >SFN Initialization Time (Optional) | Initialization time of the system frame number (System Frame Number, SFN) |
| OTDOA Cells | Broadcasts positioning reference signals in a plurality of cells |
| >OTDOA Cell Information | Configuration information of a positioning reference signal in each cell |
| >>CHOICE OTDOA Cell Information Item | OTDOA cell information item |
| >-EARFCN | Evolved (Evolved) absolute radio frequency signal |
| >>>PRS Bandwidth EUTRA | Bandwidth |
| >>>PRS Configuration Index EUTRA | Configuring index information |
| >>>CP Length EUTRA | Cyclic prefix length |
| >>>Number of DL Antenna Ports EUTRA | Antenna port quantity |
| >>>PRS-ID EUTRA | Sequence number |

TABLE 4

| | | Uplink range of NREF | Downlink range of NREF |
|---|---|---|---|
| NR operating band NR Operating band | $\Delta F_{Raster}$ (kHz) | UplinkRange of NREF (First-<Step size>-Last) | DownlinkRange of NREF (First-<Step size>-Last) |
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n20 | 100 | 166400-<20>-172400 | 158200-<20>-164200 |
| n25 | 100 | 370000-<20>-383000 | 386000-<20>-399000 |
| n28 | 100 | 140600-<20>-149600 | 151600-<20>-160600 |
| n34 | 100 | 402000-<20>-405000 | 402000-<20>-405000 |
| n38 | 100 | 514000-<20>-524000 | 514000-<20>-524000 |
| n39 | 100 | 376000-<20>-384000 | 376000-<20>-384000 |
| n40 | 100 | 460000-<20>-480000 | 460000-<20>-480000 |
| n41 | 15 | 499200-<3>-537999 | 499200-<3>-537999 |
| | 30 | 499200-<6>-537996 | 499200-<6>-537996 |
| n50 | 100 | 286400-<20>-303400 | 286400-<20>-303400 |
| n51 | 100 | 285400-<20>-286400 | 285400-<20>-286400 |
| n65 | 100 | 384000-<20>-402000 | 422000-<20>-440000 |
| n66 | 100 | 342000-<20>-356000 | 422000-<20>-440000 |
| n70 | 100 | 339000-<20>-342000 | 399000-<20>-404000 |
| n71 | 100 | 132600-<20>-139600 | 123400-<20>-130400 |
| n74 | 100 | 285400-<20>-294000 | 295000-<20>-303600 |
| n75 | 100 | N/A | 286400-<20>-303400 |
| n76 | 100 | N/A | 285400-<20>-286400 |
| n77 | 15 | 620000-<1>-680000 | 620000-<1>-680000 |
| | 30 | 620000-<2>-680000 | 620000-<2>-680000 |
| n78 | 15 | 620000-<1>-653333 | 620000-<1>-653333 |
| | 30 | 620000-<2>-653332 | 620000-<2>-653332 |
| n79 | 15 | 693334-<1>-733333 | 693334-<1>-733333 |
| | 30 | 693334-<2>-733332 | 693334-<2>-733332 |
| n80 | 100 | 342000-<20>-357000 | N/A |
| n81 | 100 | 176000-<20>-183000 | N/A |
| n82 | 100 | 166400-<20>-172400 | N/A |
| n83 | 100 | 140600-<20>-149600 | N/A |
| n84 | 100 | 384000-<20>-396000 | N/A |
| n86 | 100 | 342000-<20>-356000 | N/A |

In S403, the location management unit sends the configuration information #A to the terminal.

Specifically, the LMF sends the configuration information of the reference signal used for positioning to the terminal by using an LTE positioning protocol (LTE positioning protocol, LPP).

In this embodiment of this application, the configuration information #A includes the configuration information of the time-frequency resource to which the positioning reference signal (PRS) is mapped and the configuration information of the time-frequency resource to which the synchronization signal/physical broadcast channel SS/PBCH block is mapped.

It should be understood that the configuration information of the time-frequency resource to which the PRS is mapped and the configuration information of the time-frequency resource to which the SS/PBCH block is mapped may be sent in one piece of configuration information, or may be separately sent in two pieces of configuration information. This is not limited in this application.

In S404, the terminal receives the SS/PBCH block and the positioning reference signal based on the configuration information #A.

For example, the terminal determines a time domain distribution pattern of the SS/PBCH block based on a center frequency and a subcarrier spacing of the SS/PBCH block. The time domain distribution pattern of the SS/PBCH block includes the case A, the case B, the case C, the case D, and the case E. A set of REs occupied by the actually sent SS/PBCH block are determined with reference to the center frequency and an index of the SS/PBCH block.

For example, the terminal determines, based on the center frequency of the SS/PBCH block, an NR operating band to which the SS/PBCH block belongs, selects an NR operating band in {Case A, Case B, Case C, Case D, Case E} based on the NR operating band and the subcarrier spacing of the SS/PBCH block, and determines a quantity of to-be-sent SS/PBCH blocks based on the center frequency of the SS/PBCH block.

Operating bands are shown in Table 4 and Table 5. Table 4 shows NR-ARFCN operating bands in FR1, where FR1 corresponds to sub 6 GHz, that is, spectrum resources whose operating bands are lower than 6 GHz. Table 5 shows NR-ARFCN operating bands in FR2, where FR2 corresponds to a high frequency range, that is, spectrum resources of a millimeter wave band.

The terminal determines, based on the center frequency and the index of the actually sent SS/PBCH block, frequency domain distribution of the actually sent SS/PBCH block, and determines the set of occupied resource elements (resource element, RE) by combining time domain and frequency domain.

Whether the positioning reference signal overlaps a time-frequency resource for actually sending an SS/PBCH block in a cell is determined based on reference information, where the reference information includes a periodicity, an offset, a start symbol, and a symbol quantity that correspond to the positioning reference signal. If at least one SS/PBCH is mapped to a symbol, the PRS is not mapped to the symbol. Alternatively, if an RB in a symbol includes an RE of at least one SS/PBCH block, the reference signal used for positioning is not mapped to the RB in the symbol.

It should be understood that a minimum granularity in frequency domain is one subcarrier, and one time-frequency resource element (RE) includes one OFDM symbol and one subcarrier. An RE is used as a basic unit during resource mapping at a physical layer. All OFDM symbols in one slot and 12 subcarriers in frequency domain form one resource block (RB), and the resource block may be used as a basic unit for resource scheduling.

TABLE 5

NR-ARFCN operating bands in $FR_2$

| NR operating band NR Operating band | $\Delta F_{Raster}$ (kHz) | Uplink and downlink range of $N_{REF}$ Uplink and Downlink Range of $N_{REF}$ (First-<Step size>-Last) |
|---|---|---|
| n257 | 60 | 2054166-<1>-2104165 |
|  | 120 | 2054167-<2>-2104165 |
| n258 | 60 | 2016667-<1>-2070832 |
|  | 120 | 2016667-<2>-2070831 |
| n260 | 60 | 2229166-<1>-2279165 |
|  | 120 | 2229167-<2>-2279165 |
| n261 | 60 | 2070833-<1>-2084999 |
|  | 120 | 2070833-<2>-2084999 |

Table 6 shows channel rasters that can be used for the SS/PBCH block in FR1, including an operating frequency number, a subcarrier spacing, a time domain distribution pattern, and a GSCN range. FR1 corresponds to sub-6 GHz, that is, spectrum resources whose operating bands are lower than 6 GHz.

TABLE 6

Channel rasters that can be used for an SS block in an $FR_1$ operating band

| NR operating band number NR Operating band | Subcarrier spacing SS Block SCS | Time domain distribution pattern SS Block pattern | GSCN range Range of GSCN (First-<Step size>-Last) |
|---|---|---|---|
| n1 | 15 kHz | Case A | 5279-<1>-5419 |
| n2 | 15 kHz | Case A | 4829-<1>-4969 |
| n3 | 15 kHz | Case A | 4517-<1>-4693 |
| n5 | 15 kHz | Case A | 2177-<1>-2230 |
|  | 30 kHz | Case B | 2183-<1>-2224 |
| n7 | 15 kHz | Case A | 6554-<1>-6718 |
| n8 | 15 kHz | Case A | 2318-<1>-2395 |
| n12 | 15 kHz | Case A | 1828-<1>-1858 |
| n20 | 15 kHz | Case A | 1982-<1>-2047 |
| n25 | 15 kHz | Case A | 4829-<1>-4981 |
| n28 | 15 kHz | Case A | 1901-<1>-2002 |
| n34 | 15 kHz | Case A | 5030-<1>-5056 |
| n38 | 15 kHz | Case A | 6431-<1>-6544 |
| n39 | 15 kHz | Case A | 4706-<1>-4795 |
| n40 | 15 kHz | Case A | 5756-<1>-5995 |
| n41 | 15 kHz | Case A | 6246-<3>-6717 |
|  | 30 kHz | Case C | 6252-<3>-6714 |
| n50 | 15 kHz | Case A | 3584-<1>-3787 |
| n51 | 15 kHz | Case A | 3572-<1>-3574 |
| n65 | 15 kHz | Case A | 5279-<1>-5494 |
| n66 | 15 kHz | Case A | 5279-<1>-5494 |
|  | 30 kHz | Case B | 5285-<1>-5488 |
| n70 | 15 kHz | Case A | 4993-<1>-5044 |
| n71 | 15 kHz | Case A | 1547-<1>-1624 |
| n74 | 15 kHz | Case A | 3692-<1>-3790 |
| n75 | 15 kHz | Case A | 3584-<1>-3787 |
| n76 | 15 kHz | Case A | 3572-<1>-3574 |
| n77 | 30 kHz | Case C | 7711-<1>-8329 |
| n78 | 30 kHz | Case C | 7711-<1>-8051 |
| n79 | 30 kHz | Case C | 8480-<16>-8880 |

The time domain distribution manner of the SS/PBCH block is defined in section 4.1 in the technical specification TS38.213[10].

Table 7 shows channel rasters that can be used for the SS block in FR2, including an operating band number, a subcarrier spacing, a time domain distribution pattern, and a GSCN range. FR2 corresponds to a high frequency range, that is, spectrum resources of a millimeter wave band.

TABLE 7

Channel rasters that can be used for an SS block in an $FR_2$ operating band

| Operating band NR Operating band | Subcarrier spacing SS Block SCS | Time domain distribution pattern SS Block pattern | GSCN range Range of GSCN (First-<Step size>-Last) |
|---|---|---|---|
| n257 | 120 kHz | Case D | 22388-<1>-22558 |
|  | 240 kHz | Case E | 22390-<2>-22556 |
| n258 | 120 kHz | Case D | 22257-<1>-22443 |
|  | 240 kHz | Case E | 22258-<2>-22442 |
| n260 | 120 kHz | Case D | 22995-<1>-23166 |
|  | 240 kHz | Case E | 22996-<2>-23164 |
| n261 | 120 kHz | Case D | 22446-<1>-22492 |
|  | 240 kHz | Case E | 22446-<2>-22490 |

The time domain distribution manner of the SS/PBCH block is defined in section 4.1 in the technical specification TS38.213[10].

For example, the terminal receives the SS/PBCH block based on information about the periodicity and the offset of the SS/PBCH block.

For example, the terminal determines a time domain position of the SS/PBCH block based on the periodicity of the SS/PBCH block and the offset relative to the initialization time of the system frame, and then determines a frequency domain position of the SS/PBCH block based on the frequency domain distribution of the SS/PBCH block. In this way, the SS/PBCH block is obtained.

For example, the terminal receives the positioning reference signal based on the configuration information of the time-frequency resource to which the positioning reference signal is mapped.

For example, a time-frequency position to which a reference signal is mapped is obtained based on a start resource block RB index, a port number, a frequency domain density, a start symbol index, a symbol quantity, a bandwidth, a configuration index, and frequency hopping indication information, to obtain the reference signal.

It should be noted that, when the time-frequency resource to which the SS/PBCH block is mapped overlaps the time-frequency resource to which the PRS is mapped, the PRS is not received on the overlapped time-frequency resource.

In S405, the terminal sends a measurement result #E to the location management unit.

For example, the terminal measures the PRS to obtain at least two reference signal time differences (RSTD), performs a positioning operation, and then sends a result to the LMF by using the LPP, where the RSTD is a TDOA in the OTDOA positioning.

For another example, the terminal device measures the PRS to obtain a downlink angle of departure DAOD, and sends a result to the LMF, so that the LMF obtains a location of the terminal based on the measurement result and according to a specific algorithm. For the specific algorithm, refer to records in the current technology.

In this way, the terminal may learn of time-frequency information of an SS/PBCH block in each cell, and after obtaining the time-frequency information of the SS/PBCH block, accurately receive the reference signal used for positioning, to flexibly configure the reference signal used for positioning.

In S406, the location management unit determines location information of the terminal based on the measurement result #E.

The location management unit receives the measurement result sent by the terminal, and the location management unit calculates the location of the UE by using a positioning algorithm, where the positioning algorithm includes but is not limited to a Chan's algorithm.

The information configuration method in this application may be further applied to a positioning technology in which a terminal performs measurement for positioning, including observed time difference of arrival OTDOA positioning, downlink angle of departure DAOD positioning, or round trip time RTT positioning.

Figure 5:
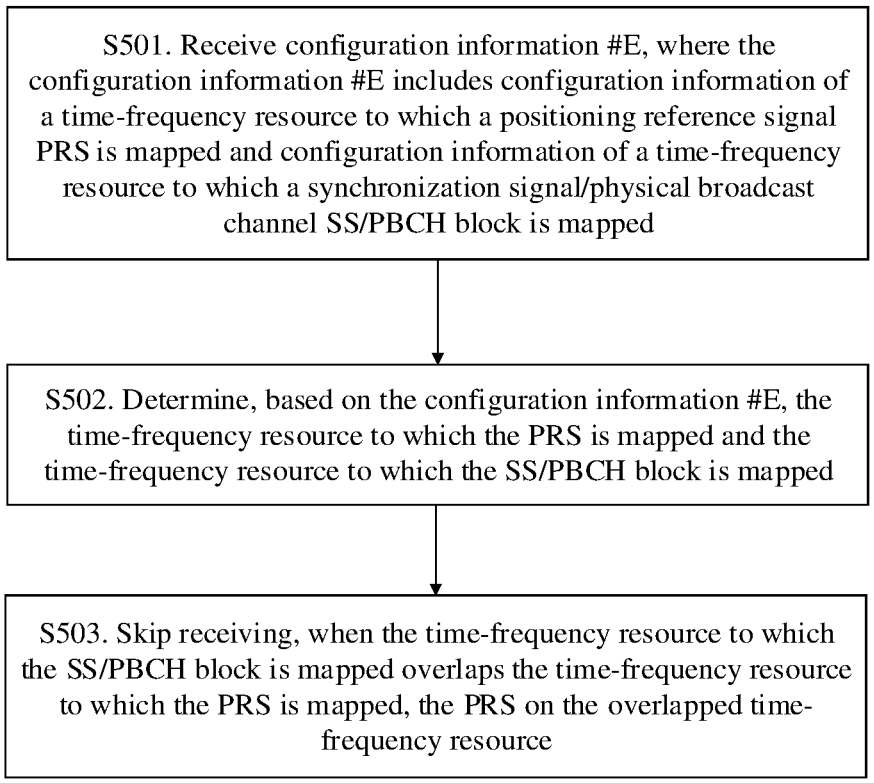
FIG. 5 is a schematic flowchart of another positioning method according to this application.

FIG. 5 is a schematic flowchart of a positioning method according to this application.

In S501, a terminal receives configuration information #E, where the configuration information #E indicates configuration information of a time-frequency resource to which a positioning reference signal (PRS) is mapped and configuration information of a time-frequency resource to which a synchronization signal/physical broadcast channel SS/PBCH block is mapped.

The configuration information of the time-frequency resource to which the SS/PBCH block is mapped includes: a time domain distribution manner of the time-frequency resource to which the SS/PBCH block is mapped and frequency domain information of the time-frequency resource to which the SS/PBCH block is mapped, where the time domain distribution manner of the time-frequency resource to which the SS/PBCH block is mapped may be any time domain distribution manner in a case Case A, a case Case B, a case Case C, a case Case D, and a case Case E.

Alternatively, the configuration information of the time-frequency resource to which the SS/PBCH block is mapped includes at least one of the following information: a subcarrier spacing of the time-frequency resource to which the SS/PBCH block is mapped, index information used to indicate the time-frequency resource to which the SS/PBCH block is mapped, or frequency information of the time-frequency resource to which the SS/PBCH block is mapped.

For example, the index information used to indicate the time-frequency resource to which the SS/PBCH block is mapped includes a position of the SS/PBCH block in an SS/PBCH burst.

Alternatively, the configuration information of the time-frequency resource to which the SS/PBCH block is mapped includes a periodicity of the SS/PBCH block and an offset relative to an initialization time of a system frame. The offset may be an absolute time period, for example, an integer multiple of 0 ms or 5 ms.

In S502, the terminal determines, based on the configuration information #E, the time-frequency resource to which the PRS is mapped and the time-frequency resource to which the SS/PBCH block is mapped.

The determining, based on the configuration information #E, the time-frequency resource to which the SS/PBCH block is mapped includes: determining, based on the time domain distribution manner of the time-frequency resource to which the SS/PBCH block is mapped, a time domain resource to which the SS/PBCH block is mapped, and determining, based on the frequency domain information of the time-frequency resource to which the SS/PBCH block is mapped, a frequency domain resource to which the SS/PBCH block is mapped, determining, based on the subcarrier spacing of the time-frequency resource to which the SS/PBCH block is mapped and the frequency information of the time-frequency resource to which the SS/PBCH block is mapped, a time domain resource to which the SS/PBCH block is mapped, or determining the time domain resources of the SS/PBCH block based on the periodicity and the offset of the SS/PBCH block.

In S503, when the time-frequency resource to which the SS/PBCH block is mapped overlaps the time-frequency resource to which the PRS is mapped, the PRS is not received on the overlapped time-frequency resource.

That is, the terminal receives the positioning reference signal (PRS) based on the configuration information #E.

Because the terminal device does not receive the positioning reference signal (PRS) on the time-frequency resource on which the time-frequency resource to which the SS/PBCH block is mapped overlaps the time-frequency resource to which the PRS is mapped, interference between the positioning reference signal (PRS) and the synchronization signal/physical broadcast channel SS/PBCH block is reduced. Therefore, accuracy of positioning the terminal device is improved.

Optionally, the terminal device may measure the positioning reference signal (PRS) based on the configuration information #E, to obtain a measurement result, and the terminal device sends the measurement result to a location management unit, where the measurement result is used by the location management unit to determine location information of the terminal device.

Figure 6:
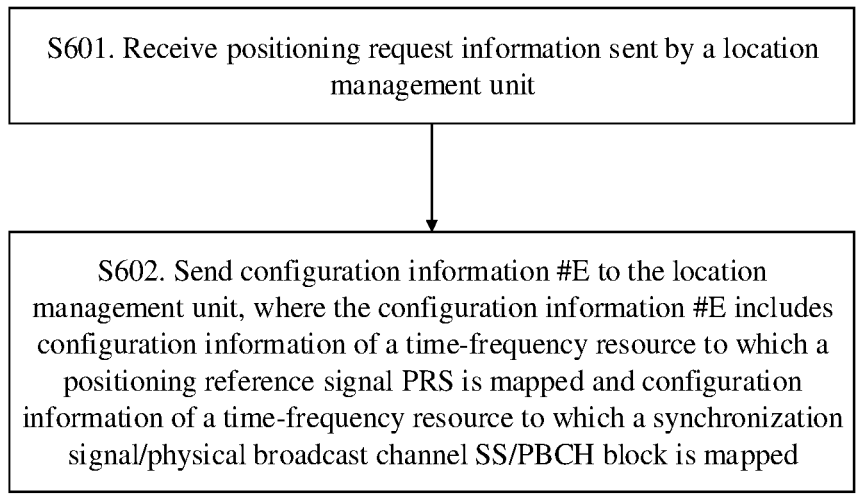
FIG. 6 is a schematic flowchart of still another positioning method according to this application.

FIG. 6 is a schematic flowchart of a positioning method according to this application.

In S601, a base station receives a positioning request message sent by a location management unit.

In S602, the base station sends configuration information #E to the location management unit, where the configuration information #E includes configuration information of a time-frequency resource to which a positioning reference signal (PRS) is mapped and configuration information of a time-frequency resource to which a synchronization signal/physical broadcast channel SS/PBCH block is mapped.

The configuration information of the time-frequency resource to which the SS/PBCH block is mapped includes: a time domain distribution manner of the time-frequency resource to which the SS/PBCH block is mapped and frequency domain information of the time-frequency resource to which the SS/PBCH block is mapped, where the time domain distribution manner of the time-frequency resource to which the SS/PBCH block is mapped may be any time domain distribution manner in a case Case A, a case Case B, a case Case C, a case Case D, and a case Case E.

Alternatively, the configuration information of the time-frequency resource to which the SS/PBCH block is mapped includes at least one of the following information: a subcarrier spacing of the time-frequency resource to which the SS/PBCH block is mapped, index information used to indicate the time-frequency resource to which the SS/PBCH block is mapped, or frequency information of the time-frequency resource to which the SS/PBCH block is mapped.

For example, the index information used to indicate the time-frequency resource to which the SS/PBCH block is mapped includes a position of the SS/PBCH block in an SS/PBCH burst.

Alternatively, the configuration information of the time-frequency resource to which the SS/PBCH block is mapped includes a periodicity of the SS/PBCH block and an offset relative to an initialization time of a system frame. The offset may be an absolute time period, for example, an integer multiple of 0 ms or 5 ms.

Because the terminal device does not receive the positioning reference signal (PRS) on the time-frequency resource on which the time-frequency resource to which the SS/PBCH block is mapped overlaps the time-frequency resource to which the PRS is mapped, interference between the positioning reference signal (PRS) and the synchronization signal/physical broadcast channel SS/PBCH block is reduced. Therefore, accuracy of positioning the terminal device is improved.

Figure 7:
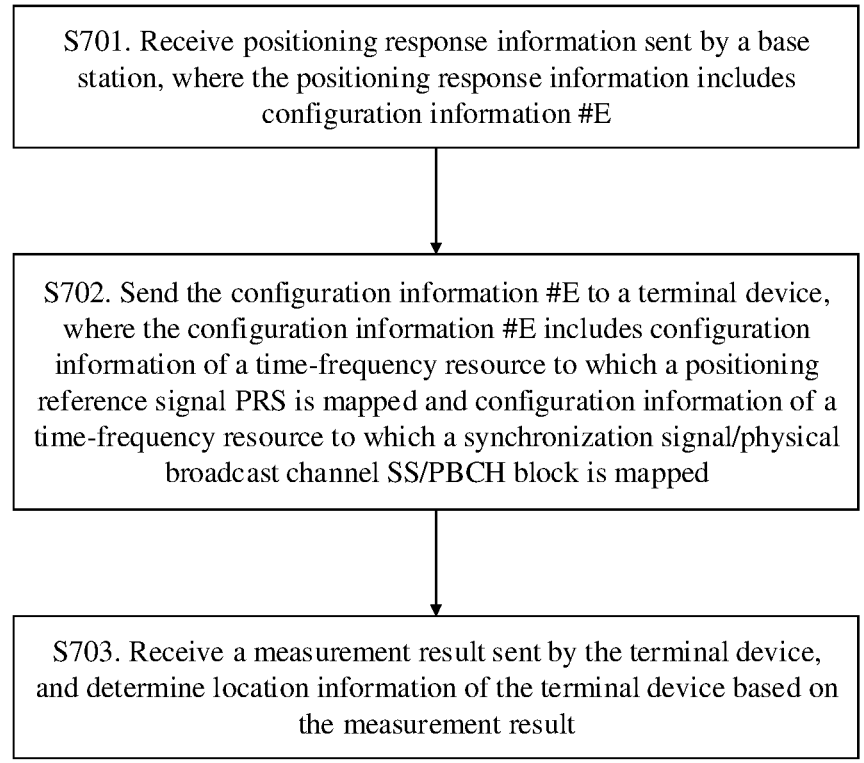
FIG. 7 is a schematic flowchart of still another positioning method according to this application.

FIG. 7 is a schematic flowchart of a positioning method according to this application.

In S701, a location management unit receives a positioning response message sent by a base station, where the positioning response message includes configuration information #E.

Configuration information of a time-frequency resource to which an SS/PBCH block is mapped includes: a time domain distribution manner of the time-frequency resource to which the SS/PBCH block is mapped and frequency domain information of the time-frequency resource to which the SS/PBCH block is mapped, where the time domain distribution manner of the time-frequency resource to which the SS/PBCH block is mapped may be any time domain distribution manner in a case Case A, a case Case B, a case Case C, a case Case D, and a case Case E.

Alternatively, the configuration information of the time-frequency resource to which the SS/PBCH block is mapped includes at least one of the following information: a subcarrier spacing of the time-frequency resource to which the SS/PBCH block is mapped, index information used to indicate the time-frequency resource to which the SS/PBCH block is mapped, or frequency information of the time-frequency resource to which the SS/PBCH block is mapped.

For example, the index information used to indicate the time-frequency resource to which the SS/PBCH block is mapped includes a position of the SS/PBCH block in an SS/PBCH burst.

Alternatively, the configuration information of the time-frequency resource to which the SS/PBCH block is mapped includes a periodicity of the SS/PBCH block and an offset relative to an initialization time of a system frame. The offset may be an absolute time period, for example, an integer multiple of 0 ms or 5 ms.

In S702, the location management unit sends the configuration information #E to a terminal device, where the configuration information #E includes configuration information of a time-frequency resource to which a positioning reference signal (PRS) is mapped and the configuration information of the time-frequency resource to which the synchronization signal/physical broadcast channel SS/PBCH block is mapped.

In S703, the location management unit receives a measurement result sent by the terminal device, and determines location information of the terminal device based on the measurement result.

In this embodiment of this application, the location management unit (location management function, LMF) sends configuration information of a reference signal used for positioning to the terminal. The configuration information includes an SS/PBCH block actually sent in each cell, a periodicity of the SS/PBCH block, and a frequency of the SS/PBCH block. The terminal obtains, based on the configuration information, a set of resource elements REs corresponding to the SS/PBCH block in the cell, and determines, based on reference information, whether the positioning reference signal overlaps a time-frequency resource for actually sending the SS/PBCH block in the cell. The reference information includes a periodicity, an offset, a start symbol, and a symbol quantity that correspond to the PRS. If an RB in a symbol includes an RE of at least one SS/PBCH block, the PRS is not mapped to the RB in the symbol.

Because the terminal device does not receive the positioning reference signal (PRS) on the time-frequency resource on which the time-frequency resource to which the SS/PBCH block is mapped overlaps the time-frequency resource to which the PRS is mapped, interference between the positioning reference signal (PRS) and the synchronization signal/physical broadcast channel SS/PBCH block is reduced. Therefore, accuracy of positioning the terminal device is improved.

As an example instead of a limitation, in the embodiments of this application, the LMF may alternatively be a radio access network-location management component (radio access network-location management component, RAN-LMC). In this case, communication between the gNB and the RAN-LMC may be performed by using an NRPPa or an Xn application protocol (xn application protocol, XnAP), and communication between the terminal and the RAN-LMC may be performed by using an LPP, an NPP, or radio resource control (radio resource control, RRC).

Figure 8:
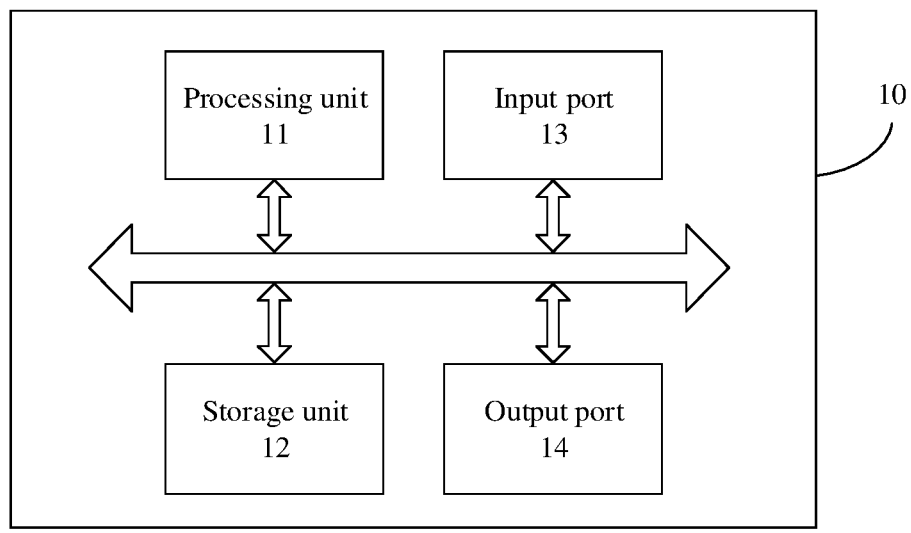
FIG. 8 is a schematic structural diagram of a communication apparatus according to this application.

According to the foregoing methods, FIG. 8 is a schematic diagram of a communication apparatus 10 according to an embodiment of this application. As shown in FIG. 8, the apparatus 10 may be a terminal device, or may be a chip or a circuit, for example, a chip or a circuit that may be disposed in the terminal device.

The apparatus 10 may include a processing unit 11 (that is, an example of a processing unit) and a storage unit 12. The storage unit 12 is configured to store instructions, and the processing unit 11 is configured to execute the instructions stored in the storage unit 12, so that the apparatus 10 implements the steps performed by the terminal device in the foregoing methods.

Further, the apparatus 10 may further include an input port 13 (an example of a communication unit) and an output port 14 (another example of the communication unit). Further, the processing unit 11, the storage unit 12, the input port 13, and the output port 14 may communicate with each other through an internal connection path, to transmit a control signal and/or a data signal. The storage unit 12 is configured to store a computer program. The processing unit 11 may be configured to invoke the computer program from the storage unit 12 and run the computer program, to control the input port 13 to receive a signal, and control the output port 14 to send a signal, to complete the steps performed by the terminal device in the foregoing methods. The storage unit 12 may be integrated into the processing unit 11, or may be disposed separately from the processing unit 11.

Optionally, if the apparatus 10 is a terminal device, the input port 13 is a receiver, and the output port 14 is a transmitter. The receiver and the transmitter may be a same physical entity or different physical entities. When being the same physical entity, the receiver and the transmitter may be collectively referred to as a transceiver.

Optionally, if the apparatus 10 is a chip or a circuit, the input port 13 is an input interface and the output port 14 is an output interface.

In an implementation, it may be considered that functions of the input port 13 and the output port 14 are implemented by using a transceiver circuit or a dedicated transceiver chip. It may be considered that the processing unit 11 may be implemented by using a dedicated processing chip, a processing circuit, a processing unit, or a universal chip.

In another implementation, it may be considered that the terminal device provided in this embodiment of this application is implemented by using a general-purpose computer. To be specific, program code for implementing functions of the processing unit 11, the input port 13, and the output port 14 is stored in the storage unit 12, and a general-purpose processing unit implements the functions of the processing unit 11, the input port 13, and the output port 14 by executing the code in the storage unit 12.

In an implementation, the input port 13 is configured to receive first configuration information, where the first configuration information indicates configuration information of a time-frequency resource to which a positioning reference signal (PRS) is mapped and configuration information of a time-frequency resource to which a synchronization signal/physical broadcast channel SS/PBCH block is mapped. The processing unit 11 is configured to determine, based on the first configuration information, the time-frequency resource to which the PRS is mapped and the time-frequency resource to which the SS/PBCH block is mapped. When the time-frequency resource to which the SS/PBCH block is mapped overlaps the time-frequency resource to which the PRS is mapped, the processing unit 11 controls the input port 13 not to receive the PRS on the overlapped time-frequency resource.

As an example instead of a limitation, the processing unit 11 is further configured to measure the positioning reference signal (PRS) based on the first configuration information, to obtain a first measurement result, to control the output port 14 to send the first measurement result to a location management unit, where the first measurement result is used by the location management unit to determine location information of the terminal device.

Figure 9:
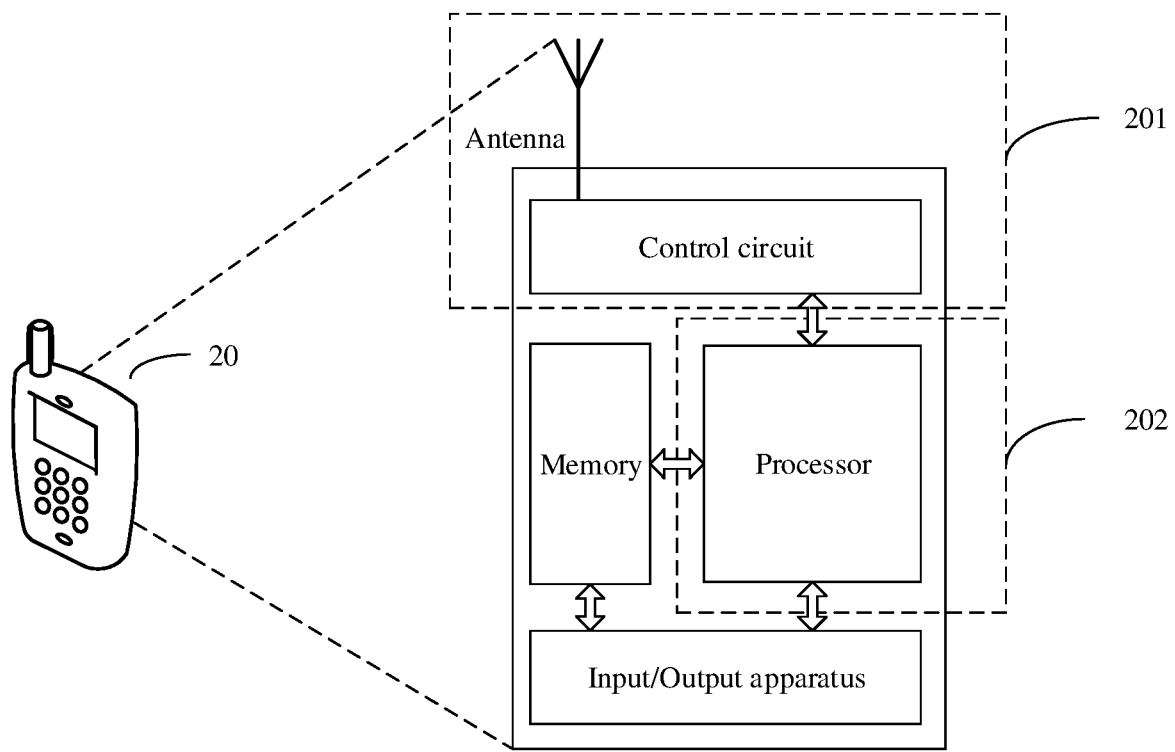
FIG. 9 is a schematic structural diagram of a terminal device according to this application.

FIG. 9 is a schematic structural diagram of a terminal device 20 according to this application. The apparatus 10 may be disposed in the terminal device 20, or the apparatus 10 itself may be the terminal device 20. In other words, the terminal device 20 may perform an action performed by the terminal device in the foregoing methods.

For ease of description, FIG. 9 shows only main components of the terminal device. As shown in FIG. 9, the terminal device 20 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the actions described in the foregoing embodiments of the information configuration method. The memory is mainly configured to store the software program and the data, for example, store the first configuration information described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to send/receive a radio frequency signal in an electromagnetic wave form. The input/output apparatus, such as a touchscreen, a display screen, or a keyboard, is mainly configured to: receive data entered by a user, and output data to the user.

After the terminal device is powered on, the processor may read the software program in a storage unit, explain and execute instructions of the software program, and process the data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 9 shows only one memory and only one processor. An actual terminal device may include a plurality of processors and a plurality of memories. The memory may also be referred to as a storage medium, a storage device, or the like. This is not limited in this embodiment of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit are integrated into the processor in FIG. 9. A person skilled in the art may understand that the baseband processor and the central processing unit each may be an independent processor, and are interconnected by using such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

For example, in this embodiment of this application, the antenna having a transceiver function and the control circuit may be considered as a transceiver unit 201 of the terminal device 20, and the processor having a processing function may be considered as a processing unit 202 of the terminal device 20. As shown in FIG. 9, the terminal device 20 includes the transceiver unit 201 and the processing unit 202. The transceiver unit may also be referred to as a transceiver, a transceiver machine, a transceiver apparatus, or the like. Optionally, a component that is in the transceiver unit 201 and that is configured to implement a receiving function may be considered as a receiving unit, and a component that is in the transceiver unit 201 and that is configured to implement a sending function may be considered as a sending unit. In other words, the transceiver unit 201 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

Figure 10:
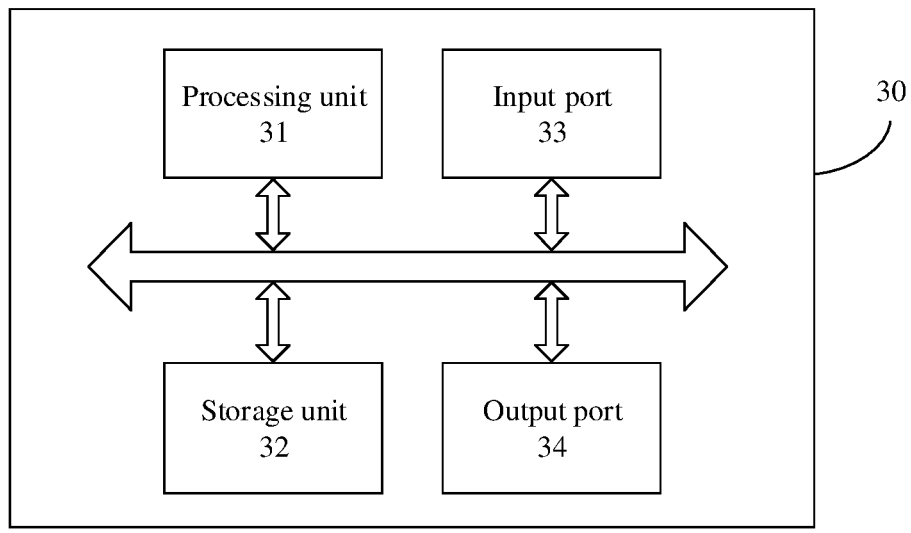
FIG. 10 is a schematic structural diagram of another communication apparatus according to this application.

According to the foregoing methods, FIG. 10 is a schematic diagram of a communication apparatus 30 according to an embodiment of this application. As shown in FIG. 10, the apparatus 30 may be a network device (for example, an access network device #A), or may be a chip or a circuit, for example, a chip or a circuit that may be disposed in the network device.

The apparatus 30 may include a processing unit 31 and a storage unit 32. The storage unit 32 is configured to store instructions, and the processing unit 31 is configured to execute the instructions stored in the storage unit 32, so that the apparatus 30 implements the steps performed by the network device in the foregoing methods.

Further, the apparatus 30 may further include an input port 33 (namely, an example of a communication unit) and an output port 33 (namely, another example of the communication unit).

Further, the processing unit 31, the storage unit 32, the input port 33, and the output port 34 may communicate with each other through an internal connection path, to transmit a control signal and/or a data signal.

In addition, it may be considered that the network device provided in this embodiment of this application is implemented by using a general-purpose computer. To be specific, program code for implementing functions of the processing unit 31, the input port 33, and the output port 34 is stored in the storage unit, and a general-purpose processing unit implements the functions of the processing unit 31, the input port 33, and the output port 34 by executing the code in the storage unit.

The storage unit 32 is configured to store a computer program.

In an implementation, the processing unit 31 may be configured to invoke the computer program from the storage unit 32 and run the computer program, to control the output port 34 to send first configuration information to a location management unit, where the first configuration information includes configuration information of a time-frequency resource to which a positioning reference signal (PRS) is mapped and configuration information of a time-frequency resource to which a synchronization signal/physical broadcast channel SS/PBCH block is mapped. The input port 33 is configured to receive a positioning request message sent by the location management unit.

The foregoing listed functions and actions of the modules or units in the apparatus 30 are merely examples for description. The modules or units in the apparatus 30 may be configured to perform actions or processing processes performed by the network device (for example, the access network device #A) in the foregoing methods. To avoid repetition, detailed descriptions are omitted herein.

For concepts, explanations, detailed descriptions, and other steps of the apparatus 30 that are related to the technical solutions provided in the embodiments of this application, refer to the descriptions of the content in the foregoing methods or other embodiments. Details are not described herein again.

Figure 11:
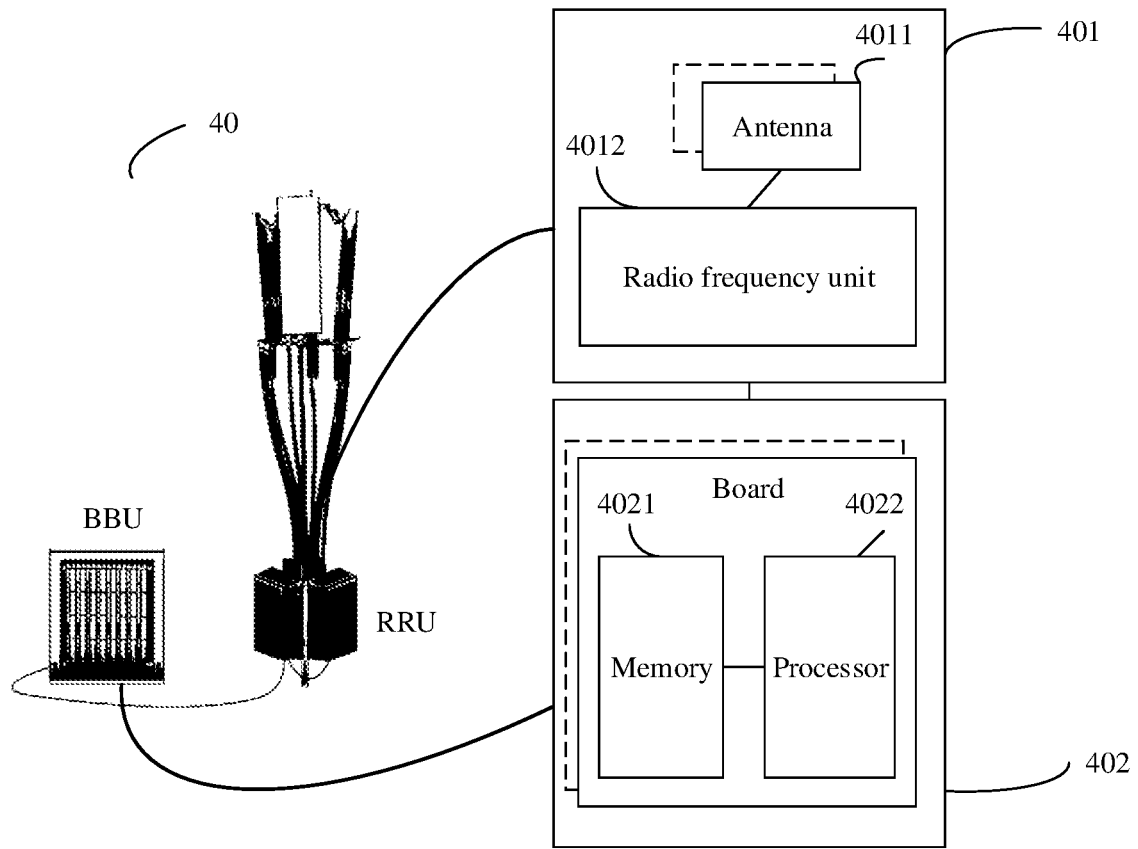
FIG. 11 is a schematic structural diagram of another network device according to this application.

FIG. 11 is a schematic structural diagram of a network device 40 according to an embodiment of this application. The network device may be configured to implement a function of the network device (for example, an access network device #A) in the foregoing methods. The network device 40 includes one or more radio frequency units such as a remote radio unit (remote radio unit, RRU) 401 and one or more baseband units (baseband unit, BBU) (which may also be referred to as digital units, digital unit, DU) 402. The RRU 401 may be referred to as a transceiver unit, a transceiver machine, a transceiver circuit, a transceiver, or the like, and may include at least one antenna 4011 and a radio frequency unit 4012. The RRU 401 is mainly configured to: send and receive a radio frequency signal, and perform conversion between a radio frequency signal and a baseband signal, for example, configured to send the signaling message in the foregoing embodiments to a terminal device. The BBU 402 is mainly configured to: perform baseband processing, control a base station, and so on. The RRU 401 and the BBU 402 may be physically disposed together, or may be physically separate, to be specific, in a distributed base station.

The BBU 402 is a control center of the base station, may also be referred to as a processing unit, and is mainly configured to implement a baseband processing function, for example, channel coding, multiplexing, modulation, and spreading. For example, the BBU (the processing unit) 402 may be configured to control the base station 40 to perform the operation procedure related to the base station device in the foregoing method embodiments.

As an example instead of a limitation, the access network device #A receives a positioning request message sent by a location management unit, and sends first configuration information to the location management unit, where the first configuration information includes configuration information of a time-frequency resource to which a positioning reference signal (PRS) is mapped and configuration information of a time-frequency resource to which a synchronization signal/physical broadcast channel SS/PBCH block is mapped.

In an example, the BBU 402 may include one or more boards, and a plurality of boards may jointly support a radio access network (such as an LTE system or a 5G system) of a single access standard, or may separately support radio access networks of different access standards. The BBU 402 further includes a memory 4021 and a processor 4022. The memory 4021 is configured to store a necessary instruction and necessary data. For example, the memory 4021 stores the codebook in the foregoing embodiments. The processor 4022 is configured to control the base station to perform a necessary action, for example, control the base station to perform the operation procedure related to the base station device in the foregoing method embodiments. The memory 4021 and the processor 4022 may serve the one or more boards. In other words, a memory and a processor may be independently disposed on each board. Alternatively, a plurality of boards may share a same memory and a same processor. In addition, a necessary circuit may be further disposed on each board.

In a possible implementation, with development of a system-on-a-chip (system-on-chip, SoC) technology, all or some functions of the BBU 402 and the RRU 401 may be implemented through the SoC technology, for example, implemented through a base station function chip. The base station function chip integrates components such as a processor, a memory, and an antenna port. A program of a base station-related function is stored in the memory. The processor executes the program to implement the base station-related function. Optionally, the base station function chip can also read a memory outside the chip to implement the base station-related function.

It should be understood that the structure of the network device shown in FIG. 11 is merely a possible form, and should not constitute any limitation on the embodiments of this application. In this application, there may be a base station structure in another form in the future.

Figure 12:
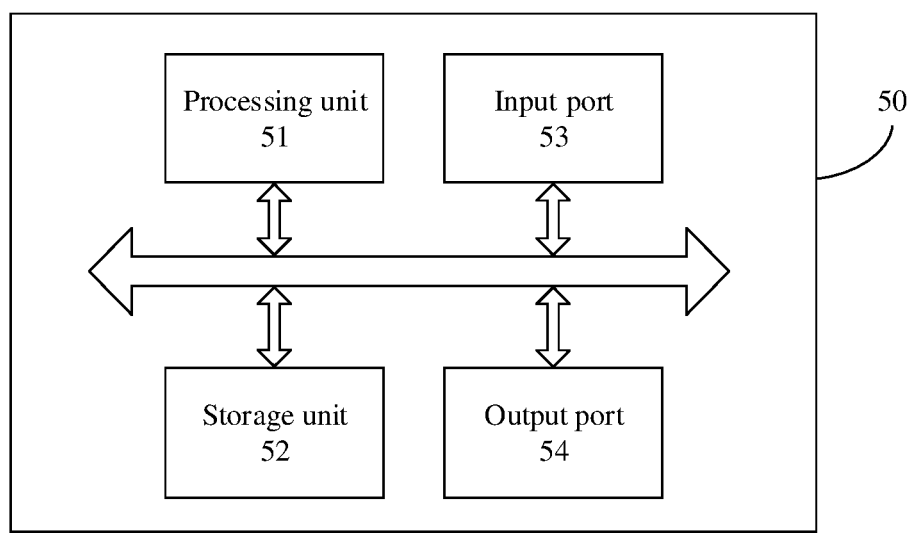
FIG. 12 is a schematic structural diagram of still another communication apparatus according to this application.

According to the foregoing methods, FIG. 12 is a schematic diagram of a communication apparatus 50 according to an embodiment of this application. As shown in FIG. 12, the apparatus 50 may be a terminal device, or may be a chip or a circuit, for example, a chip or a circuit that may be disposed in a terminal device.

The apparatus 50 may include a processing unit 51 (that is, an example of a processing unit) and a storage unit 52. The storage unit 52 is configured to store instructions, and the processing unit 51 is configured to execute the instructions stored in the storage unit 52, so that the apparatus 50 implements the steps performed by the terminal device in the foregoing methods.

Further, the apparatus 50 may further include an input port 53 (an example of a communication unit) and an output port 54 (another example of the communication unit). Further, the processing unit 51, the storage unit 52, the input port 53, and the output port 54 may communicate with each other through an internal connection path, to transmit a control signal and/or a data signal. The storage unit 52 is configured to store a computer program. The processing unit 51 may be configured to invoke the computer program from the storage unit 52 and run the computer program, to control the input port 53 to receive a signal, and control the output port 54 to send a signal, to complete the steps performed by the terminal device in the foregoing methods. The storage unit 52 may be integrated into the processing unit 51, or may be disposed separately from the processing unit 51.

Optionally, if the apparatus 50 is a terminal device, the input port 53 is a receiver and the output port 54 is a transmitter. The receiver and the transmitter may be a same physical entity or different physical entities. When being the same physical entity, the receiver and the transmitter may be collectively referred to as a transceiver.

Optionally, if the apparatus 50 is a chip or a circuit, the input port 53 is an input interface and the output port 54 is an output interface.

In an implementation, it may be considered that functions of the input port 53 and the output port 54 are implemented by using a transceiver circuit or a dedicated transceiver chip. It may be considered that the processing unit 51 may be implemented by using a dedicated processing chip, a processing circuit, a processing unit, or a general-purpose chip.

In another implementation, it may be considered that the terminal device provided in this embodiment of this application is implemented by using a general-purpose computer. To be specific, program code for implementing functions of the processing unit 51, the input port 53, and the output port 54 is stored in the storage unit 52, and a general-purpose processing unit executes the code in the storage unit 52 to implement the functions of the processing unit 51, the input port 53, and the output port 54.

In an implementation, the input poll 53 is configured to receive a positioning response message sent by a base station, where the positioning response message includes first configuration information, and the output poll 54 is configured to send the first configuration information to a terminal device, where the first configuration information includes configuration information of a time-frequency resource to which a positioning reference signal (PRS) is mapped and configuration information of a time-frequency resource to which a synchronization signal/physical broadcast channel SS/PBCH block is mapped.

Optionally, the output port 54 is further configured to send a positioning request message to the base station, where the positioning request message is used to request location information of the terminal device. The input port 53 is further configured to receive a first measurement result sent by the terminal device, where the first measurement result is used by a location management unit to determine the location information of the terminal device.

According to the methods provided in the embodiments of this application, an embodiment of this application further provides a communication system, including the network device, the terminal device, and the location management unit described above.

All or some of the foregoing embodiments may be implemented by using software, hardware, firmware, or any other combination thereof. When the software is used to implement the embodiments, all or some of the foregoing embodiments may be implemented in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that identifiers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application. It may be clearly understood by a person skilled in the art that for the purpose of convenient and brief description, for a detailed working process of the described system, apparatus, and unit, refer to a corresponding process in the foregoing method embodiments. In the several embodiments provided in this application, it should be understood that the disclosed system, apparatus, and method may be implemented in other manners. For example, the described apparatus embodiment is merely an example. For example, division into units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve objectives of the solutions of the embodiments. In addition, function units in the embodiments of this application may be integrated into one sending unit, or each of the units may exist alone physically, or two or more units are integrated into one unit. When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement that can be readily figured out by the person skilled in the art within the technical scope disclosed in this application shall fall within the protection scope of this application. Therefore, the protection scope of this application shall be subject to the protection scope of the claims.

What is claimed is:

1. An information configuration method, comprising:
receiving first configuration information, wherein the first configuration information is a single piece of configuration information that comprises configuration information of a time-frequency resource to which a positioning reference signal (PRS) is mapped and configuration information of a time-frequency resource to which a synchronization signal/physical broadcast channel (SS/PBCH) block is mapped;
determining, based on the first configuration information, the time-frequency resource to which the PRS is mapped and the time-frequency resource to which the SS/PBCH block is mapped and is actually sent; and
skipping receiving, in response to the time-frequency resource to which the SS/PBCH block is mapped and is actually sent overlapping at least a portion of the time-frequency resource to which the PRS is mapped, the overlapped time-frequency resource for the PRS, wherein the overlapped time frequency resource comprises a resource block (RB) that is in a symbol and that has a resource element of at least one SS/PBCH block.

2. The method according to claim 1, wherein the configuration information of the time-frequency resource to which the SS/PBCH block is mapped comprises:
information indicating a time domain distribution manner of the time-frequency resource to which the SS/PBCH block is mapped and frequency domain information of the time-frequency resource to which the SS/PBCH block is mapped, wherein the time domain distribution manner of the time-frequency resource to which the SS/PBCH block is mapped comprises one of a Case A, a Case B, a Case C, a Case D, or a Case E.

3. The method according to claim 2, wherein the determining, based on the first configuration information, the time-frequency resource to which the SS/PBCH block is mapped and is actually sent comprises:
determining, based on the time domain distribution manner of the time-frequency resource to which the SS/PBCH block is mapped, a time domain resource to which the SS/PBCH block is mapped; and
determining, based on the frequency domain information of the time-frequency resource to which the SS/PBCH block is mapped, a frequency domain resource to which the SS/PBCH block is mapped.

4. The method according to claim 1, wherein the configuration information of the time-frequency resource to which the SS/PBCH block is mapped comprises at least one of a subcarrier spacing of the time-frequency resource to which the SS/PBCH block is mapped, index information used to indicate the time-frequency resource to which the SS/PBCH block is mapped, or frequency information of the time-frequency resource to which the SS/PBCH block is mapped.

5. The method according to claim 4, wherein the configuration information comprises the index information and wherein the index information comprises a position of the SS/PBCH block in an SS/PBCH burst.

6. The method according to claim 4, wherein the determining, based on the first configuration information, the time-frequency resource to which the SS/PBCH block is mapped and is actually sent comprises:
determining, based on the subcarrier spacing of the time-frequency resource to which the SS/PBCH block is mapped and the frequency information of the time-frequency resource to which the SS/PBCH block is mapped, a time domain resource to which the SS/PBCH block is mapped.

7. The method according to claim 1, wherein the configuration information of the time-frequency resource to which the SS/PBCH block is mapped and is actually sent comprises a periodicity of the SS/PBCH block and an offset of the SS/PBCH block.

8. The method according to claim 7, wherein the offset of the SS/PBCH block is X ms, wherein X is an integer multiple of 0 ms or 5 ms.

9. The method according to claim 1, further comprising:
measuring the positioning reference signal (PRS) on a time-frequency resource other than the time-frequency resource to which the SS/PBCH block is mapped and is actually sent to obtain a first measurement result, wherein the first measurement result comprises an arrival time of the PRS; and
sending the first measurement result to a location management unit, wherein the first measurement result indicates to the location management unit to determine location information of a terminal device according to the measurement result.

10. The method according to claim 9, wherein the first measurement result is transmitted using a transmission mode that is one of transmission using long term evolution (LTE) positioning protocol (LPP), or transmission using a new radio (NR) positioning protocol (NRPP).

11. The method according to claim 1, wherein the configuration information of the time-frequency resource to which the positioning reference signal (PRS) is mapped comprises one or more of a start resource block (RB) index, a port number, a frequency domain density, a start symbol index, a symbol quantity, a bandwidth, a configuration index, or frequency hopping indication information.

12. The method according to claim 1, wherein the first configuration information is transmitted using a transmission mode that is one of transmission using long term evolution (LTE) positioning protocol (LPP), or transmission using a new radio (NR) positioning protocol (NRPP).

13. The method according to claim 1, further comprising:
determining, based on reference information, whether the positioning reference signal overlaps a time-frequency resource for actually sending an SS/PBCH block in a cell.

14. The method according to claim 13, wherein the reference information comprises one or more of a periodicity, an offset, a start symbol, or a symbol quantity that correspond to the positioning reference signal.

15. The method according to claim 1, wherein the skipping the receiving the PRS on the overlapped time-frequency resource comprises:
skipping mapping the PRS to a first symbol in response to the first symbol comprising at least one SS/PBCH; or
skipping mapping the PRS to the first symbol in a first resource block (RB) in response to the first symbol in the first RB comprising at least one SS/PBCH.

16. An information configuration apparatus, comprising:
a receiver;
at least one processor; and
a non-transitory computer readable medium storing a program for execution by the at least one processor, the program including instructions to
receive, through the receiver, first configuration information, wherein the first configuration information is a single piece of configuration information that comprises configuration information of a time-frequency resource to which a positioning reference signal (PRS) is mapped and configuration information of a time-frequency resource to which synchronization signal/physical broadcast channel (SS/PBCH) block is mapped; and determine, based on the first configuration information, the time-frequency resource to which the PRS is mapped and the time-frequency resource to which the SS/PBCH block is mapped and is actually sent, wherein cause, in response to the time-frequency resource to which the SS/PBCH block is mapped and is actually sent at least partly overlapping the time-frequency resource to which the PRS is mapped, the receiver to skip receiving the overlapped time-frequency resource for the PRS, wherein the overlapped time frequency resource comprises a resource block (RB) that is in a symbol and that has a resource element of at least one SS/PBCH block.

17. The apparatus according to claim 16, wherein configuration information of the time-frequency resource to which the SS/PBCH block is mapped comprises:

a time domain distribution manner of the time-frequency resource to which the SS/PBCH block is mapped and frequency domain information of the time-frequency resource to which the SS/PBCH block is mapped, wherein the time domain distribution manner of the time-frequency resource to which the SS/PBCH block is mapped comprises a Case A, a Case B, a Case C, a Case D, or a Case E.

18. The apparatus according to claim 16, wherein the configuration information of the time-frequency resource to which the SS/PBCH block is mapped comprises at least one a subcarrier spacing of the time-frequency resource to which the SS/PBCH block is mapped, index information used to indicate the time-frequency resource to which the SS/PBCH block is mapped, or frequency information of the time-frequency resource to which the SS/PBCH block is mapped.

19. The apparatus according to claim 18, wherein the configuration information comprises the index information and the index information indicates that the time-frequency resource to which the SS/PBCH block is mapped and is actually sent comprises a position of the SS/PBCH block in an SS/PBCH burst.

20. The apparatus according to claim 16, wherein the instructions to determine the time-frequency resource to which the SS/PBCH block is mapped and is actually sent include instructions to:

determine, based on the time domain distribution manner of the time-frequency resource to which the SS/PBCH block is mapped, a time domain resource to which the SS/PBCH block is mapped; and determine, based on the frequency domain information of the time-frequency resource to which the SS/PBCH block is mapped, a frequency domain resource to which the SS/PBCH block is mapped.

21. A non-transitory computer storage medium, storing a computer program for execution by a computer, the computer program having instructions for:

receiving first configuration information, wherein the first configuration information is a single piece of configuration information that comprises configuration information of a time-frequency resource to which a positioning reference signal (PRS) is mapped and configuration information of a time-frequency resource to which a synchronization signal/physical broadcast channel SS/PBCH block is mapped;

determining, based on the first configuration information, the time-frequency resource to which the PRS is mapped and the time-frequency resource to which the SS/PBCH block is mapped and is actually sent; and skipping receiving, in response to the time-frequency resource to which the SS/PBCH block is mapped and is actually sent at least partly overlapping the time-frequency resource to which the PRS is mapped, the overlapped time-frequency resource for the PRS, wherein the overlapped time frequency resource comprises a resource block (RB) that is in a symbol and that has a resource element of at least one SS/PBCH block.

* * * * *

UNITED STATES PATENT AND TRADEMARK OFFICE
CERTIFICATE OF CORRECTION

| | |
|---|---|
| PATENT NO. | : 12,069,641 B2 |
| APPLICATION NO. | : 17/401955 |
| DATED | : August 20, 2024 |
| INVENTOR(S) | : Yu et al. |

It is certified that error appears in the above-identified patent and that said Letters Patent is hereby corrected as shown below:

In the Claims

In Column 35, in Claim 18, Line 31, delete "one" and insert -- one of --.

Signed and Sealed this
First Day of October, 2024

*Katherine Kelly Vidal*

Katherine Kelly Vidal
*Director of the United States Patent and Trademark Office*